(12) United States Patent
Kim et al.

(10) Patent No.: US 12,081,246 B2
(45) Date of Patent: Sep. 3, 2024

(54) ELECTRONIC DEVICE INCLUDING 5G ANTENNA MODULE

(71) Applicant: Samsung Electronics Co., Ltd., Suwon-si (KR)

(72) Inventors: Jaehyung Kim, Suwon-si (KR); Jinkyu Bang, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 632 days.

(21) Appl. No.: 17/268,753

(22) PCT Filed: Sep. 3, 2019

(86) PCT No.: PCT/KR2019/011333
§ 371 (c)(1),
(2) Date: Jul. 13, 2021

(87) PCT Pub. No.: WO2020/050591
PCT Pub. Date: Mar. 12, 2020

(65) Prior Publication Data
US 2022/0200640 A1    Jun. 23, 2022

(30) Foreign Application Priority Data

Sep. 6, 2018    (KR) .......................... 10-2018-0106738

(51) Int. Cl.
*H04B 1/00*    (2006.01)
*H01Q 1/22*    (2006.01)
(Continued)

(52) U.S. Cl.
CPC ......... *H04B 1/0067* (2013.01); *H01Q 1/2283* (2013.01); *H01Q 1/243* (2013.01);
(Continued)

(58) Field of Classification Search
CPC ...... H04B 1/0067; H04B 1/40; H01Q 1/2283; H01Q 1/243; H01Q 21/20; H01Q 1/38;
(Continued)

(56) References Cited

U.S. PATENT DOCUMENTS 6,452,556 B1    9/2002    Ha et al.
6,914,566 B2 *  7/2005    Beard ...................... H01Q 9/27
                                                            343/702
(Continued)

FOREIGN PATENT DOCUMENTS

CN    102185938 A    9/2011
CN    104953276 A    9/2015
(Continued)

OTHER PUBLICATIONS

Korean Notice of Allowance with English translation dated Jan. 30, 2023; Korean Appln. No. 10-2018-0106738.
(Continued)

*Primary Examiner* — Jinsong Hu
*Assistant Examiner* — Rui M Hu
(74) *Attorney, Agent, or Firm* — Jefferson IP Law, LLP

(57) ABSTRACT

An electronic device may include a first PCB including a non-conductive region and a conductive region operating as a ground, a first wireless communication circuit disposed on the first PCB, and a 5th generation (5G) antenna module disposed adjacent to the first PCB. The 5G antenna module may include at least one second PCB including an antenna array and a conductive layer operating as a ground of the antenna array and a second wireless communication circuit electrically connected to the antenna array. The second PCB may include a first portion and a second portion having a predetermined angle with the first portion. The first portion may be disposed adjacent to the non-conductive region and at least part of the second portion may be disposed adjacent (Continued)

to the conductive region. The first wireless communication circuit may be electrically connected to a first point of the conductive layer included in the first portion and transmitting or receiving a first RF signal in a first frequency band by using the conductive region and at least part of the conductive layer. The second wireless communication circuit may transmit or receive a second RF signal in a second frequency band by using the antenna array. Besides, various embodiments as understood from the specification are also possible.

18 Claims, 16 Drawing Sheets

(51) Int. Cl.
    *H01Q 1/24*         (2006.01)
    *H01Q 21/20*       (2006.01)
    *H04B 1/40*         (2015.01)
    *H04M 1/02*         (2006.01)

(52) U.S. Cl.
    CPC ............... *H01Q 21/20* (2013.01); *H04B 1/40* (2013.01); *H04M 1/026* (2013.01)

(58) Field of Classification Search
    CPC .... H01Q 9/0414; H01Q 21/28; H01Q 9/0407; H01Q 1/085; H01Q 11/14; H01Q 3/01; H01Q 21/065; H01Q 1/523; H01Q 19/021; H01Q 21/0075; H01Q 21/08; H01Q 25/001; H01Q 3/26; H04M 1/026; H04M 1/0277; H04M 1/0249
    See application file for complete search history.

(56) References Cited

U.S. PATENT DOCUMENTS

| | | | |
|---|---|---|---|
| 7,265,719 B1* | 9/2007 | Moosbrugger | H01Q 21/065 343/893 |
| 7,701,399 B2 | 4/2010 | Aoyama et al. | |
| 8,405,556 B2 | 3/2013 | Sung et al. | |
| 8,525,737 B2* | 9/2013 | Rho | H01Q 9/0421 343/702 |
| 8,525,740 B2 | 9/2013 | Jeong et al. | |
| 9,628,115 B1 | 4/2017 | Tsai et al. | |
| 9,917,368 B2* | 3/2018 | Garcia | G06K 19/07749 |
| 9,935,359 B2 | 4/2018 | Kim et al. | |
| 10,084,241 B1* | 9/2018 | Jenwatanavet | H01Q 1/48 |
| 10,122,837 B2 | 11/2018 | Tsai et al. | |
| 10,461,404 B2 | 10/2019 | Xiong et al. | |
| 10,581,139 B2 | 3/2020 | Kato et al. | |
| 10,637,127 B2 | 4/2020 | Ryu et al. | |
| 10,693,216 B1 | 6/2020 | Ryu et al. | |
| 10,854,954 B2 | 12/2020 | Dinh et al. | |
| 10,862,195 B2 | 12/2020 | Ouyang et al. | |
| 10,862,212 B2* | 12/2020 | Yamagajo | H01Q 9/42 |
| 10,868,362 B2* | 12/2020 | Yun | H01Q 21/065 |
| 10,998,622 B2 | 5/2021 | Sakong et al. | |
| 11,069,956 B2* | 7/2021 | Kim | H01Q 21/065 |
| 11,133,574 B2* | 9/2021 | Mizunuma | H01Q 25/00 |
| 11,329,364 B2* | 5/2022 | Suzuki | H01Q 21/24 |
| 11,336,030 B2* | 5/2022 | Murata | H01Q 11/14 |
| 11,381,003 B2* | 7/2022 | Omuro | H01Q 19/005 |
| 11,450,949 B2* | 9/2022 | Yun | H01Q 9/0407 |
| 11,581,635 B2* | 2/2023 | Sudo | H01Q 1/2283 |
| 11,616,288 B2* | 3/2023 | Kim | H01Q 1/2283 343/702 |
| 11,664,596 B2* | 5/2023 | Dalmia | H01Q 3/01 343/700 MS |
| 2013/0050056 A1* | 2/2013 | Lee | H01Q 3/30 343/893 |
| 2014/0335785 A1 | 11/2014 | Kato et al. | |
| 2015/0070219 A1 | 3/2015 | Dinh et al. | |
| 2015/0116169 A1* | 4/2015 | Ying | H01Q 21/28 343/729 |
| 2015/0256211 A1 | 9/2015 | Miyazaki | |
| 2015/0325925 A1* | 11/2015 | Kamgaing | H01L 21/4853 343/893 |
| 2016/0056544 A1* | 2/2016 | Garcia | H01Q 9/0407 343/725 |
| 2016/0118713 A1* | 4/2016 | Hong | H01Q 9/0407 343/702 |
| 2016/0172761 A1* | 6/2016 | Garcia | G06K 19/077 343/700 MS |
| 2017/0062953 A1* | 3/2017 | Teshima | H01Q 9/42 |
| 2017/0110787 A1 | 4/2017 | Ouyang et al. | |
| 2017/0250460 A1 | 8/2017 | Shin et al. | |
| 2018/0026341 A1* | 1/2018 | Mow | H01Q 1/243 343/702 |
| 2018/0074173 A1* | 3/2018 | Trotta | G01S 7/003 |
| 2018/0115356 A1* | 4/2018 | Jain | H01L 24/16 |
| 2018/0175901 A1* | 6/2018 | Heo | H04B 1/40 |
| 2018/0226367 A1* | 8/2018 | Babcock | H03F 1/347 |
| 2018/0233817 A1* | 8/2018 | Izawa | H01Q 5/35 |
| 2018/0261566 A1* | 9/2018 | Babcock | H01L 25/16 |
| 2018/0294558 A1* | 10/2018 | Hoang | H01Q 9/42 |
| 2019/0020100 A1* | 1/2019 | Jong | H01Q 1/48 |
| 2019/0027808 A1* | 1/2019 | Mow | H04R 5/04 |
| 2019/0089069 A1* | 3/2019 | Niroo | H01Q 13/10 |
| 2019/0181891 A1* | 6/2019 | Harper | H04L 27/0002 |
| 2019/0229404 A1* | 7/2019 | Xia | H01Q 21/205 |
| 2019/0252770 A1* | 8/2019 | Thakur | H01Q 5/335 |
| 2019/0260110 A1* | 8/2019 | Thai | H01Q 9/0471 |
| 2019/0260127 A1* | 8/2019 | Shi | H01Q 9/42 |
| 2019/0334225 A1 | 10/2019 | Lee et al. | |
| 2019/0372229 A1* | 12/2019 | Dalmia | H01Q 3/01 |
| 2020/0021010 A1* | 1/2020 | Ou | H01Q 21/065 |
| 2020/0028241 A1 | 1/2020 | Jung et al. | |
| 2020/0036083 A1* | 1/2020 | Kim | H01Q 21/28 |
| 2020/0091608 A1* | 3/2020 | Alpman | H03L 7/145 |
| 2020/0119453 A1* | 4/2020 | Takayama | H01Q 1/243 |
| 2020/0145038 A1* | 5/2020 | Onaka | H03F 3/19 |
| 2020/0161749 A1* | 5/2020 | Onaka | H01Q 21/24 |
| 2020/0203804 A1* | 6/2020 | Khripkov | H01Q 1/243 |
| 2021/0007213 A1* | 1/2021 | Ryu | H05K 1/028 |
| 2021/0014971 A1* | 1/2021 | Wang | H05K 1/144 |
| 2021/0083367 A1 | 3/2021 | Ouyang et al. | |
| 2021/0151874 A1* | 5/2021 | Sudo | H01Q 1/523 |
| 2021/0257728 A1 | 8/2021 | Sakong et al. | |
| 2022/0166127 A1* | 5/2022 | Jeong | H01L 23/66 |
| 2023/0352824 A1* | 11/2023 | Yamakawa | H01Q 21/08 |

FOREIGN PATENT DOCUMENTS

| | | | |
|---|---|---|---|
| CN | 205029703 U | | 2/2016 |
| CN | 106252829 A | | 12/2016 |
| CN | 106450773 A | | 2/2017 |
| CN | 107395788 A | | 11/2017 |
| CN | 107768842 A | | 3/2018 |
| EP | 2 975 695 A1 | | 1/2016 |
| KR | 10-2002-0022484 A | | 3/2002 |
| KR | 10-2007-0116550 A | | 12/2007 |
| KR | 10-2009-0115254 A | | 11/2009 |
| KR | 10-2010-0132246 A | | 12/2010 |
| KR | 10-2011-0025547 A | | 3/2011 |
| KR | 10-2013-0143475 A | | 12/2013 |
| KR | 10-2018-0010957 A | | 1/2018 |
| KR | 10-2018-0013203 A | | 2/2018 |
| KR | 10-2018-0031120 A | | 3/2018 |
| WO | 2018/084327 A1 | | 5/2018 |

OTHER PUBLICATIONS

European Search Report dated Mar. 16, 2023; European Appln. No. 19 856 843.8- 1224.

European Search Report dated Sep. 24, 2021; European Appln. No. 19856843.8-1216 / 3820126 PCT/KR2019011333.

Chinese Office Action with English translation dated Aug. 22, 2022; Chinese Appln. No. 201980057130.X.

(56) References Cited

OTHER PUBLICATIONS

Korean Office Action with English translation dated Jul. 18, 2022; Korean Appln. No. 10-2018-0106738.

* cited by examiner (a)

(b)

(a)

(b)

ELECTRONIC DEVICE INCLUDING 5G ANTENNA MODULE

TECHNICAL FIELD

Various embodiments disclosed in this specification relate to an electronic device including a 5th generation (5G) antenna module.

BACKGROUND ART

With the development of an information technology (IT), various types of electronic devices such as a smartphone or a tablet personal computer (PC) are being widely supplied. An electronic device may perform wireless communication with any other electronic device or a base station by using an antenna module.

Nowadays, as the network traffic of an electronic device sharply increases, a 5G communication technology capable of transmitting or receiving a large amount of information is being developed. The use of a signal in a frequency band (e.g., about 3 GHz or higher) for a 5G mobile communication network makes it possible to shorten a wavelength of the signal in units of millimeters, and thus a bandwidth may be used more widely. This means that a large amount of information is transmitted or received.

There is a still need for a conventional communication technology using a signal in a frequency band lower than 5G communication technology. For example, in addition to an antenna module for 5G communication, the electronic device may include antennas for WiFi communication, Bluetooth communication, and 4G communication that use a frequency band of 6 GHz or lower. In this specification, an antenna supporting the conventional communication technology may be referred to as a "legacy antenna".

DISCLOSURE

Technical Problem

A 5G antenna may be implemented as an independent module including an antenna array supporting beamforming. The antenna array may include a plurality of antenna elements. To improve the performance of the 5G antenna, the 5G antenna may include an array antenna composed of more antenna elements, and thus the size of the 5G antenna module may increase. As the 5G antenna and various antennas (e.g., legacy antennas) are mounted in an electronic device, a space inside the electronic device may be insufficient.

Embodiments disclosed in this specification are intended to provide an electronic device capable of mounting a 5G antenna module and a legacy antenna in a limited internal space of the electronic device.

Technical Solution

According to an embodiment disclosed in this specification, an electronic device may include a first printed circuit board (PCB) including a non-conductive region and a conductive region operating as a ground, a first wireless communication circuit disposed on the first PCB, and a 5th generation (5G) antenna module disposed adjacent to the first PCB. The 5G antenna module may include at least one second PCB including an antenna array and a conductive layer operating as a ground of the antenna array and a second wireless communication circuit electrically connected to the antenna array. The second PCB may include a first portion and a second portion having a predetermined angle with the first portion. The first portion may be disposed adjacent to the non-conductive region and at least part of the second portion may be disposed adjacent to the conductive region. The first wireless communication circuit may be electrically connected to a first point of the conductive layer included in the first portion and transmitting or receiving a first RF signal in a first frequency band by using the conductive region and at least part of the conductive layer. The second wireless communication circuit may transmit or receive a second RF signal in a second frequency band by using the antenna array.

Furthermore, according to an embodiment disclosed in this specification, an electronic device may include a housing that includes a first plate, a second plate facing away from the first plate, and a side member surrounding a space between the first plate and the second plate, a first PCB that is disposed in the housing, an antenna structure that is disposed in the housing and includes a second PCB including a first surface facing in a first direction, a second surface facing away from the first surface, and at least one conductive layer between the first surface and the second surface, and an antenna array paralleled to the first surface and formed on the first surface or in the second PCB, a first wireless communication circuit transmitting and/or receiving a first signal including a first frequency between 600 MHz and 6 GHz and electrically connected to one point of the at least one conductive layer providing an electrical length corresponding to the first frequency, and a second wireless communication circuit electrically connected to the antenna array and transmitting and/or receiving a second signal including a second frequency between 6 GHz and 100 GHz.

Advantageous Effects

According to various embodiments disclosed in the specification, it is possible to implement a legacy antenna that operates a conductive layer included in a 5G antenna module as a radiator.

According to various embodiments disclosed in the specification, an electronic device may reduce a mounting space for the 5G antenna module and the legacy antenna.

Besides, a variety of effects directly or indirectly understood through the specification may be provided.

With regard to description of drawings, the same or similar components will be marked by the same or similar reference signs.

MODE FOR INVENTION

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
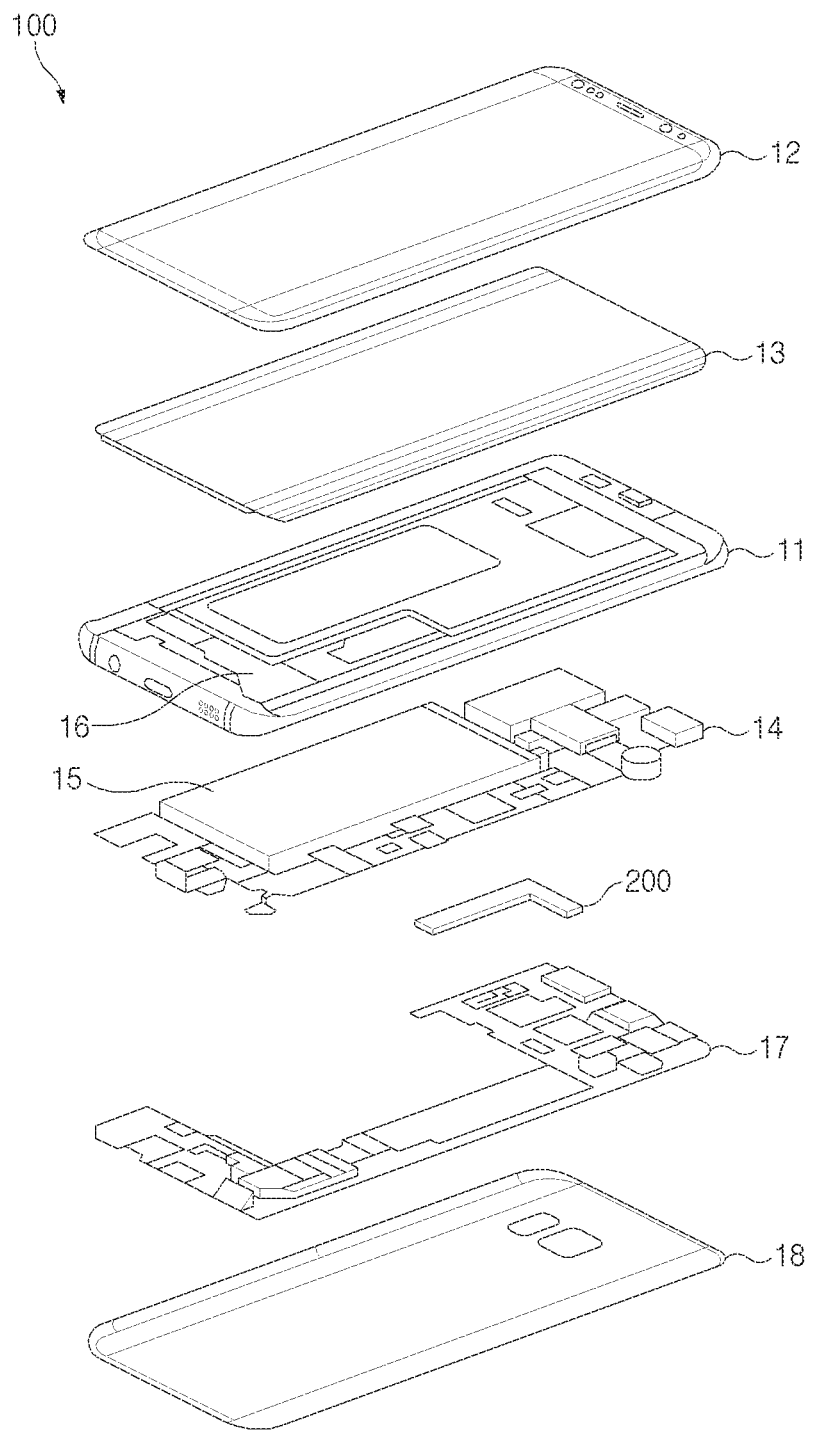
FIG. 1 is an exploded perspective view of an electronic device, according to an embodiment.

FIG. 1 is an exploded perspective view of an electronic device, according to an embodiment.

Referring to FIG. 1, an electronic device 100 may include a side bezel structure 11, a first support member 16 (e.g., a bracket), a front plate 12, a display 13, a printed circuit board (PCB) 14, a battery 15, a 5G antenna module 200, a second support member 17 (e.g., a rear case), and a back plate 18. In an embodiment, the electronic device 100 may not include a part (e.g., the first support member 16 or the second support member 17) of the components illustrated in FIG. 1 or may further include any other component not illustrated in FIG. 1.

The side bezel structure 11 may be combined with the front plate 12 and the back plate 18 to form a housing of the electronic device 100. The housing may form the exterior of the electronic device 100 and may protect components disposed in the electronic device 100 against an external environment (e.g., moisture or impact).

The housing may include a first surface, a second surface facing away from the first surface, and a side surface surrounding a space between the first surface and the second surface. For example, at least part of the front plate 12 may form the first surface of the housing. At least part of the back plate 18 may form the second surface of the housing. The side bezel structure 11 may form a side surface of the housing together with a portion of the front plate 12 and/or a portion of the back plate 18. The side surface may be understood as a region that surrounds a space between a first surface on which the front plate 12 is disposed and a second surface on which the back plate 18 is disposed. The side surface (e.g., a side surface 152 of FIG. 10A) of the housing may include a first side region (e.g., a first side region 150-1 of FIG. 10A) extending in a first direction, a second side region (e.g., a second side region 150-2 of FIG. 10A) extending in a second direction perpendicular to the first direction from one end of the first side region, a third side region (e.g., a third side region 150-3 of FIG. 10A) extending in the first direction from one end of the second side region, and a fourth side region extending in the second direction from one end of the third side region. According to an embodiment, at least part of the side bezel structure 11 may include a conductive region. In various embodiments, the conductive region may be supplied with a power to cause an electromagnetic resonance. The electronic device 100 may receive or transmit a signal in a specified frequency band by using the electromagnetic resonance. In an embodiment, the specified frequency band may be 600 MHz or higher and 6 GHz or lower.

The first support member 16 may be disposed within the electronic device 100 so as to be connected with the side bezel structure 11 or may be integrally formed with the side bezel structure 11. In an embodiment, the first support member 16 may support or fix electronic components disposed in the electronic device 100, for example, the PCB 14, electronic components disposed on the PCB 14, or various kinds of modules (e.g., the 5G antenna module 200) performing various functions in a direction of the front plate 12.

The front plate 12 may be coupled to the side bezel structure 11 and the back plate 18 to form the housing. In an embodiment, the front plate 12 may protect an internal component of the electronic device 100, for example, the display 13 against impact coming from a front surface of the electronic device 100. According to various embodiments, the front plate 12 may transmit a light generated from the display 13 or a light incident onto various kinds of sensors (e.g., an image sensor, an iris sensor, or a proximity sensor) disposed on the front surface of the electronic device 100.

The display 13 may be disposed adjacent to one surface of the front plate 12. According to various embodiments, the display 13 may be electrically connected with the PCB 14 to output content (e.g., a text, an image, a video, an icon, a widget, or a symbol) or to receive a touch input (e.g., a touch, a gesture, or a hovering) from the user.

Various electronic components, various elements, or various printed circuits of the electronic device 100 may be mounted on the PCB 14. For example, an application processor (AP), a communication processor (CP), or an intermediate frequency integrated circuit (IFIC), or a communication circuit (e.g., a second wireless communication circuit of FIG. 2) may be mounted on the PCB 14.

According to an embodiment, the PCB 14 may include at least one or more ground regions. The ground region may be understood as a conductive region of a specified size or larger. In an embodiment, the ground region may be used as a ground for electronic components included in the PCB 14, for example, for an operation of a communication circuit. In this specification, the PCB 14 may be referred to as a "first PCB", a "main PCB", a "main board", or a "printed board assembly (PBA)".

The battery 15 may convert chemical energy and electrical energy bidirectionally. For example, the battery 15 may convert chemical energy into electrical energy and may supply the converted electrical energy to the display 13 and various components or modules mounted on the PCB 14. According to an embodiment, a power management module for managing the charging and discharging of the battery 15 may be included in the PCB 14.

The 5G antenna module 200 may be disposed adjacent to the PCB 14. For example, the 5G antenna module 200 may be physically connected with at least part of the PCB 14. For another example, the 5G antenna module 200 may be disposed adjacent to the PCB 14, and may be electrically connected with electronic components disposed on the PCB 14, for example, a communication module, a communication processor, or an application processor.

According to an embodiment, the 5G antenna module 200 may transmit and receive RF signals through a part of the housing that is disposed adjacent to the 5G antenna module 200. For example, the 5G antenna module 200 may be disposed adjacent to an inner side of the housing of the electronic device 100. Hereinafter, the 5G antenna module 200 disclosed in the specification may be disposed adjacent to a side surface (e.g., first to fourth side regions) of the housing. For example, when the housing is formed in the shape of a rectangle or substantially a rectangle as illustrated in FIG. 1, the 5G antenna module 200 may be disposed adjacent to each side surface of the housing. For another example, when the housing is formed in the shape of a circle, the 5G antenna module 200 may be disposed to be spaced from the center of the circle as much as a specified distance toward the side surface.

According to an embodiment, the 5G antenna module 200 may include the antenna array. The 5G antenna module 200 may include a first surface facing in a first direction and a second surface facing away from the first direction. For example, the antenna array may be formed on the first surface.

According to an embodiment, the 5G antenna module 200 may be a module for communicating with a base station or another electronic device 100 by using a millimeter wave signal. In the disclosure, the millimeter wave signal may include, for example, a radio frequency (RF) signal having a frequency band ranging from 3 GHz to 300 GHz. In this specification, the 5G antenna module 200 may be referred to as an "antenna structure" or a "communication device".

The second support member 17 may be interposed between the back plate 18 and the PCB 14. According to an embodiment, identically or similarly to the first support member 16, the second support member 17 may support or fix the electronic components in the electronic device 100 in a direction of the back plate 18.

The back plate 18 may be coupled to the side bezel structure 11 and the front plate 12 to form the housing. In an embodiment, the back plate 18 may protect internal components of the electronic device 100 against impact coming from the back surface of the electronic device 100.

In the specification, the description given with reference to FIG. 1 may be identically applied to components having the same reference numerals/marks as the components of the electronic device 100 described with reference to FIG. 1.

Figure 2:
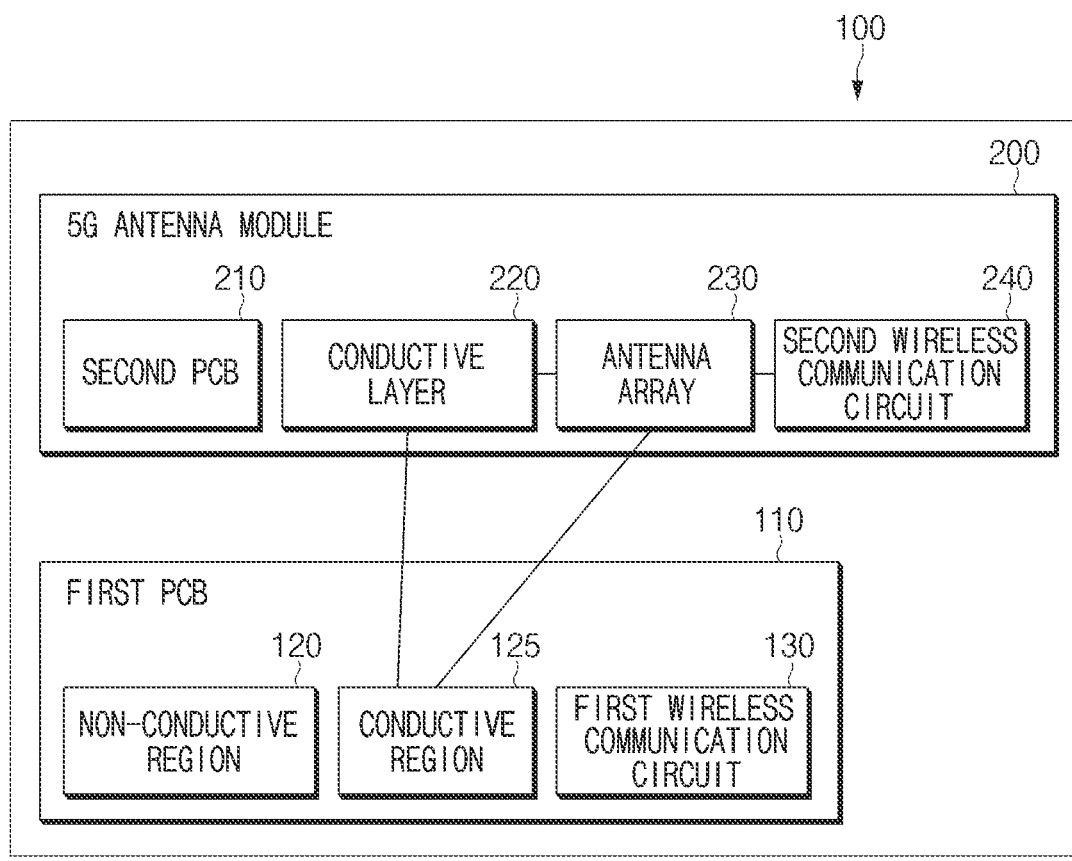
FIG. 2 illustrates a block diagram of an electronic device, according to an embodiment.

FIG. 2 illustrates a block diagram of an electronic device, according to an embodiment;

Referring to FIG. 2, the electronic device 100 may include the 5G antenna module 200 (e.g., the 5G antenna module 200 of FIG. 1) and a first printed circuit board (PCB) 110 (e.g., the PCB 14 of FIG. 1). Hereinafter, the first printed circuit board 110 may be described as the first PCB 110.

In an embodiment, the first PCB 110 may include a non-conductive region 120 and a conductive region 125. The conductive region 125 may function as a ground region within the electronic device 100. For example, it may be understood that the non-conductive region 120 is a region in which a metal member has been removed from the first PCB 110.

In an embodiment, a first wireless communication circuit 130 and an inter frequency integrated circuit (IFIC) 140 may be disposed in the conductive region 125 of the first PCB 110. For example, the first wireless communication circuit 130 may be referred to as a "communication circuit" for feeding a legacy antenna. The first wireless communication circuit 130 may transmit and receive an RF signal including a frequency band of 6 GHz or less, using at least one conductive pattern or a conductive layer included in the electronic device 100 as a radiator. Hereinafter, the RF signal transmitted and received by the first wireless communication circuit 130 is described as a first RF signal.

The IFIC 140 may process a signal in an intermediate frequency band of the 5G antenna module 200. It may be understood that a second wireless communication circuit 240 and the IFIC 140 are a communication circuit for 5G communication. In various embodiments, the communication processor for the IFIC 140 may be implemented separately from communication processors of the first wireless communication circuit 130 and the second wireless communication circuit 240.

In an embodiment, the 5G antenna module 200 may include a PCB 210 (hereinafter, a second PCB 210), a conductive layer 220, an antenna array 230, and the second wireless communication circuit 240. For example, the second PCB 210 may be a main PCB included in the electronic device 100.

According to an embodiment, the antenna array 230 may include a plurality of antenna elements. In various embodiments, the second wireless communication circuit 240 may generate an RF signal having at least one beam pattern by using the plurality of antenna elements included in the antenna array 230. For example, the RF signal may include a millimeter wave signal including a signal in an ultra-high frequency band of, for example, 3 GHz to 300 GHz. Hereinafter, the RF signal transmitted and received by the second wireless communication circuit 240 is described as a second RF signal.

According to an embodiment, the 5G antenna module 200 including the antenna array 230 may form a beam pattern having directivity in a specific direction. Accordingly, the 5G antenna module 200 may transmit and receive a second RF signal.

According to an embodiment, the second wireless communication circuit 240 may transmit and receive a second RF signal by changing a direction of a beam pattern of the antenna array 230. For example, the second wireless communication circuit 240 may adjust the phase of the signal radiated from each of antenna elements. The beam pattern of the antenna array 230 may be changed based on a phase difference between signals radiated from each of the antenna elements included in the antenna array 230.

In various embodiments, the 5G antenna module 200 may have directivity in a direction of a side surface (e.g., the side bezel structure 11 of FIG. 1) of the housing, in a direction of a front surface (e.g., the front plate 12 of FIG. 1) of the housing, or in a direction of a back surface (e.g., the back plate 18 of FIG. 1) of the housing from the inside of the electronic device 100, depending on a location where the 5G antenna module 200 is disposed.

According to an embodiment, the second wireless communication circuit 240 may be electrically connected to each of a plurality of antenna elements included in the antenna array 230. The second wireless communication circuit 240 may provide a specific amount of current to the antenna elements through a feeding line connected to the plurality of antenna elements included in the antenna array 230.

According to an embodiment, the conductive layer 220 may operate as a ground region for the 5G antenna module 200. The second wireless communication circuit 240 may be electrically connected to one point of the conductive layer 220. In various embodiments, the conductive layer 220 may perform a shielding function on the 5G antenna module 200.

For example, it may be understood that the conductive layer 220 is a shield can or a shielding layer. For example, the conductive layer 220 may be disposed in a region corresponding to a region in which the second wireless communication circuit 240 on the second PCB 210 is disposed. The conductive layer 220 may perform a shielding function on the electrical signal inside the electronic device 100 with respect to the second wireless communication circuit 240.

In an embodiment, at least part of the conductive layer 220 may operate as a radiator of a legacy antenna of the electronic device 100. For example, the first wireless communication circuit 130 may be electrically connected to one point of the conductive layer 220. It may be understood that the one point (hereinafter, a first point) is a feeding point for the legacy antenna. The first wireless communication circuit 130 may transmit and receive a first RF signal through an electrical path formed in at least part of the conductive layer 220 by feeding the first point of the conductive layer 220. For example, the first wireless communication circuit 130 may be a communication circuit for WiFi communication, Bluetooth communication, or 4G communication.

According to various embodiments, the electronic device 100 may further include a configuration not illustrated in FIG. 2. For example, the electronic device 100 may further include at least one processor (e.g., a processor 1240 of FIG. 12) electrically connected to the first wireless communication circuit 130 and/or the second wireless communication circuit 240. For example, the at least one processor may include an application processor and/or a communication processor. The at least one processor may control operations of the first wireless communication circuit 130 and/or the second wireless communication circuit 240. It may be understood that the operations of the first wireless communication circuit 130 and the second wireless communication circuit 240 to be described later are operations of the at least one processor. Hereinafter, in the specification, the description given with reference to FIG. 2 may be identically applied to components having the same reference numerals/marks as the components of the electronic device 100 described with reference to FIG. 2.

Figure 3:
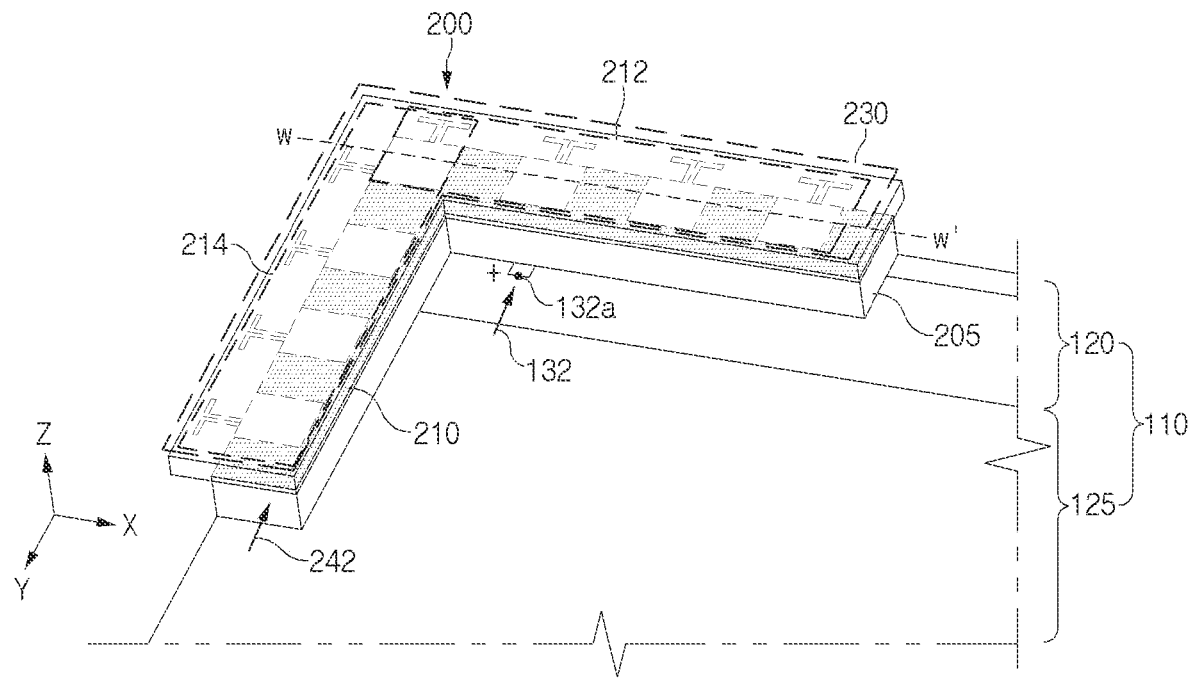
FIG. 3 is an inner perspective view of an electronic device including a 5G antenna module, according to an embodiment.
Figure 3:
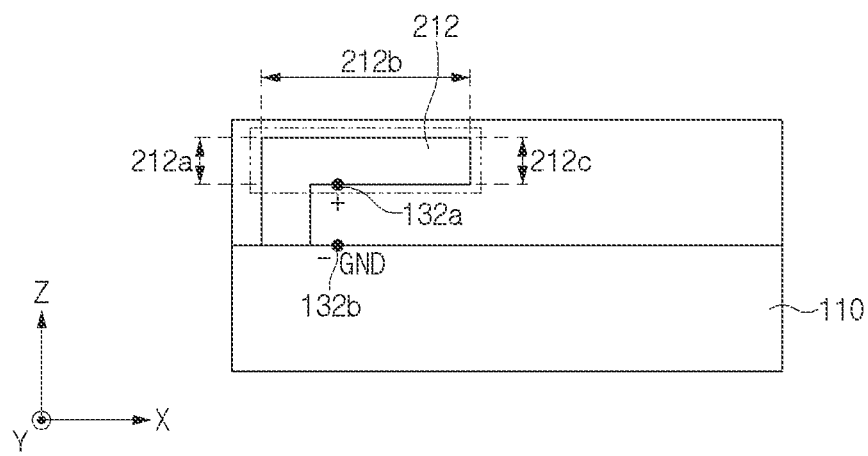

FIG. 3 is an inner perspective view of an electronic device including a 5G antenna module, according to an embodiment. The arrangement structure of illustrated in FIG. 3 is shown as an example. The first PCB 110 and the 5G antenna module 200 may be arranged differently from FIG. 3.

In an embodiment, the first PCB 110 may include the conductive region 125 and the non-conductive region 120. In an embodiment, communication circuits including the first wireless communication circuit 130 and the IFIC 140 may be disposed in the conductive region 125. At least part of the conductive region 125 may operate as a ground of a legacy antenna. For example, the conductive region 125 of the first PCB 110 may include a plurality of conductive layers. For example, the 5G antenna module 200 may be disposed parallel to the first PCB 110.

In an embodiment, the 5G antenna module 200 may include the second PCB 210 and the antenna array 230. The 5G antenna module 200 may be disposed adjacent to the first PCB 110. As illustrated in FIG. 3, for example, the antenna array 230 may be formed on one surface of the second PCB 210. In another example, when the second PCB 210 has a stacked structure, the antenna array 230 may be formed on one or more layers included in the second PCB 210.

In an embodiment, the second PCB 210 may include a first portion 212 and a second portion 214 having a predetermined angle with the first portion 212. The first portion 212 may be disposed adjacent to the non-conductive region 120 of the first PCB 110. At least part of the second portion 214 may be disposed adjacent to the conductive region 125 of the first PCB 110. For example, the 5G antenna module 200 may include a portion (e.g., the first portion 212) disposed adjacent to the non-conductive region 120 of the first PCB 110 and a portion (e.g., the second portion 214) disposed adjacent to the conductive region 125.

In various embodiments, for example, the predetermined angle may vary depending on a shape of the housing of the electronic device 100. For example, the first portion 212 and the second portion 214 may be disposed adjacent to a side surface (e.g., the side bezel structure 11 of FIG. 1) of the housing of the electronic device 100. For example, in the shape of a housing as illustrated in FIG. 1, the first portion 212 and the second portion 214 may be disposed to have a substantially right angle. This is illustrated as an example in FIGS. 3 and 6.

In an embodiment, the 5G antenna module 200 may include the conductive layer 220 (not illustrated). The first wireless communication circuit (e.g., the first wireless communication circuit 130 of FIG. 2) may be electrically connected to a first point 132a of the conductive layer 220 included in the first portion 212. The first wireless communication circuit 130 may be configured to transmit and receive a first RF signal, using at least part of the conductive region 125 of the first PCB 110 and the conductive layer 220.

For example, it may be understood that a feed point for the legacy antenna is the first point 132a of the conductive layer 220 included in the first portion 212. The conductive region 125 of the first PCB 110 may operate as a ground for the legacy antenna. At least part of the conductive layer 220 included in the first portion 212 may operate as a radiator of a legacy antenna. The first wireless communication circuit 130 may transmit and receive a first RF signal based on an electrical path formed by the first point 132a and a ground point 132b electrically connected to the conductive region 125.

In an embodiment, the conductive layer (e.g., the conductive layer 220 of FIG. 2) may operate as a ground for the antenna array 230. In this case, the conductive layer 220 may be included in the second PCB 210. For example, when the second PCB 210 has a stacked structure, the conductive layer 220 may include one or more layers included in the layer structure of the second PCB 210.

In various embodiments, the conductive layer 220 may perform a shielding function on the 5G antenna module 200. For example, the conductive layer 220 may be referred to as a shield can 205. For example, the shield can 205 may be attached to one surface of the second PCB 210. The shield can 205 may be disposed in a region corresponding to the second wireless communication circuit (e.g., the second wireless communication circuit 240 of FIG. 2) of the second PCB 210 to perform a shielding function. In this case, the first wireless communication circuit (e.g., the first wireless communication circuit 130 of FIG. 2) may be electrically connected to one point of the shield can 205 corresponding to the first portion 212 of the second PCB 210. The first wireless communication circuit 130 may be configured to receive the first RF signal through an electrical path formed based on one point of the shield can 205 and one point electrically connected to the conductive region 125 of the first PCB 110. At least part of the shield can 205 corresponding to the first portion 212 may operate as a radiator of a legacy antenna.

In various embodiments, the legacy antenna may operate as a planar inverted-F antenna (PIFA) depending on a location of the first point 132a. It may be understood that part (b) of FIG. 3 is a cross-sectional view of the structure illustrated in FIG. 3A in direction W-W'. Referring to part (b) of FIG. 3, the legacy antenna may operate as a PIFA having the conductive region 125 of the first PCB 110 as a ground plane and having at least part of the conductive layer 220 of the second PCB 210 as a patch plane.

For example, the first portion 212 of the second PCB 210 may include a first side 212a adjacent to the second portion 214, a second side 212b extending in a direction perpendicular to the first side 212a from one end of the first side 212a, and a third side 212c extending in a direction parallel to the first side 212a from one end of the second side 212b. The first wireless communication circuit 130 may be electrically connected to the first point 132a adjacent to the first side 212a. The legacy antenna may operate as a PIFA as illustrated in part (b) of FIG. 3.

Figure 4A:
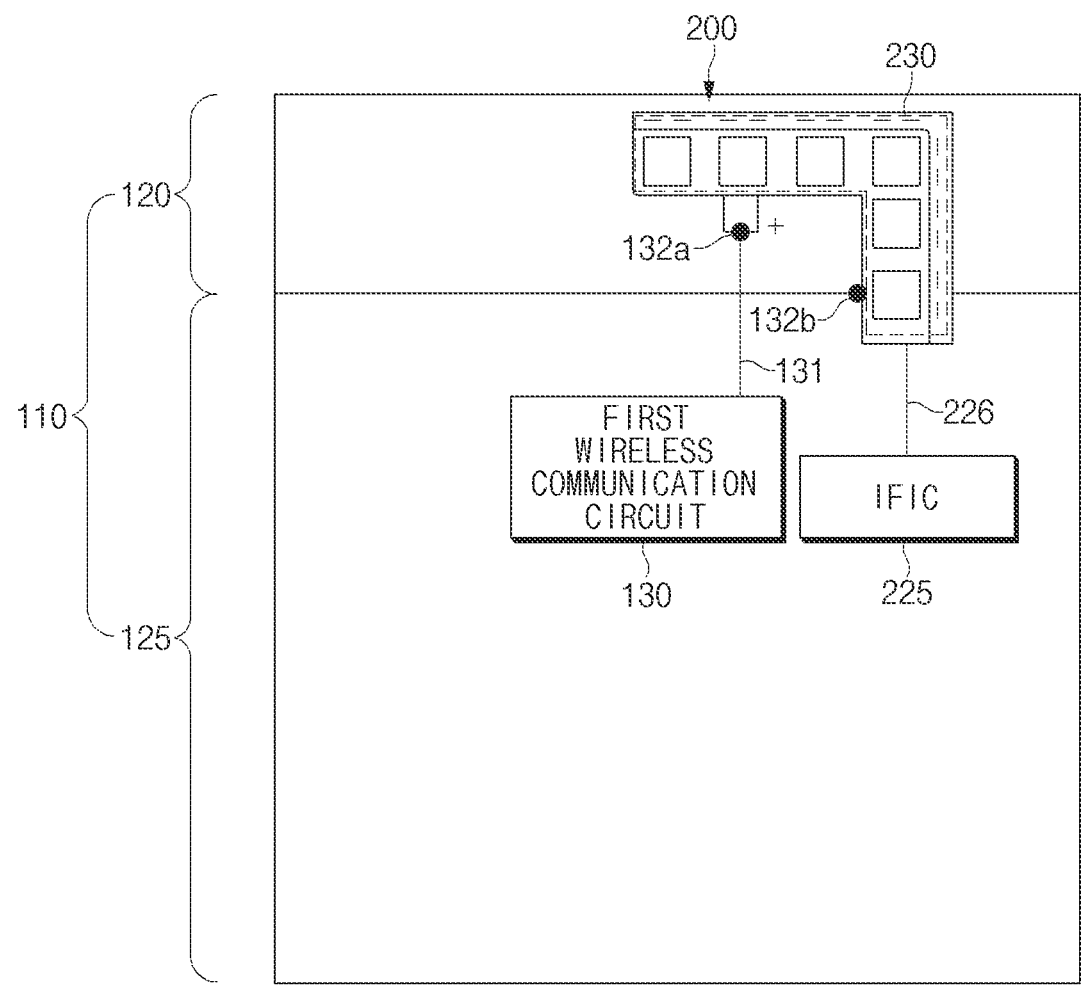
FIG. 4A illustrates one surface of a PCB disposed inside an electronic device according to an embodiment.
Figure 4B:
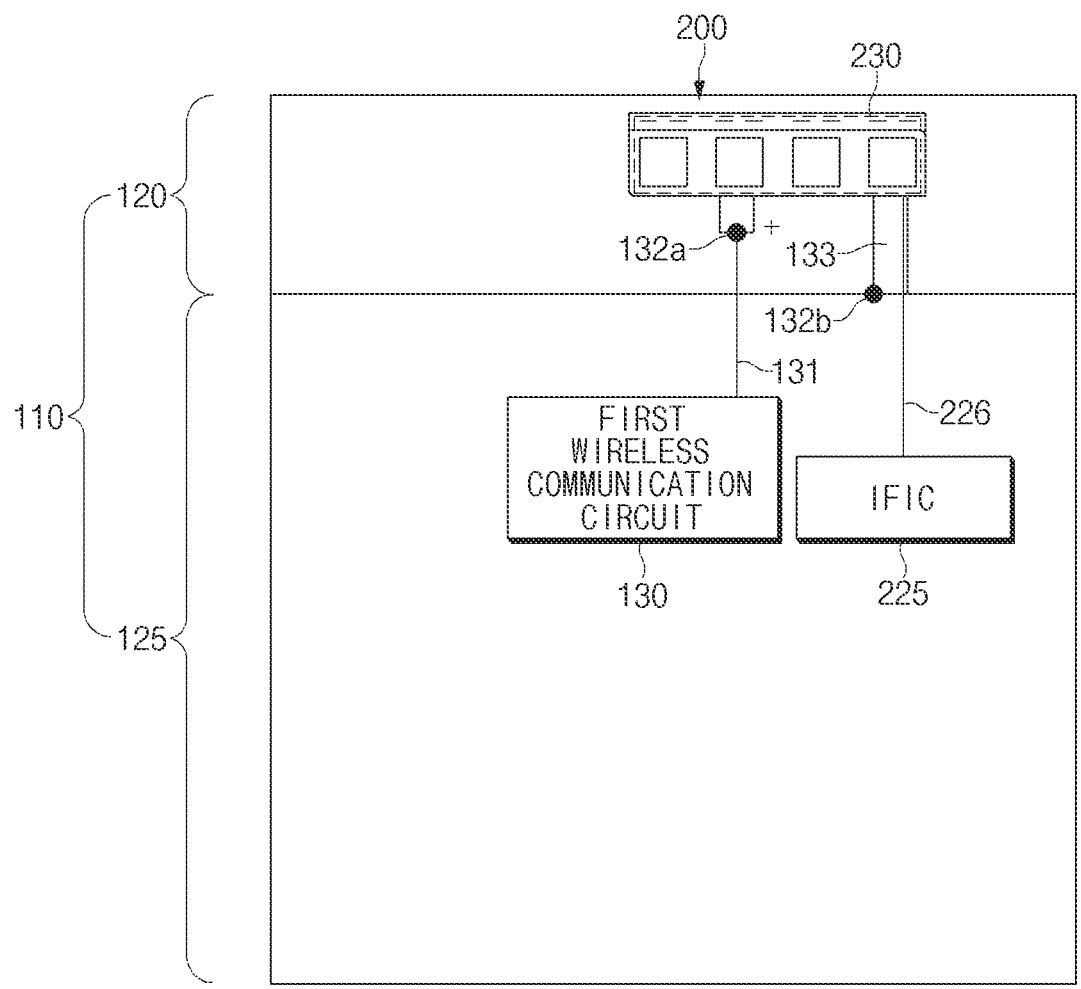
FIG. 4B illustrates one surface of a PCB disposed inside an electronic device according to an embodiment.

FIGS. 4A and 4B illustrate one surface of a PCB disposed inside an electronic device according to an embodiment. For example, it may be understood that FIGS. 4A and 4B are top views of the first PCB 110 and the 5G antenna module 200.

Referring to FIG. 4A, the 5G antenna module 200 and the first PCB 110 may be electrically and/or physically connected to each other. For example, the 5G antenna module 200 may be physically coupled to the first PCB 110 or may be electrically connected to the first PCB 110 through a plurality of conducting wires.

According to an embodiment, the first PCB 110 may include the first wireless communication circuit 130 and an IFIC 225. The IFIC 225 may convert a second RF signal received from the second wireless communication circuit 240 into a signal in an intermediate frequency band or may convert a signal in an intermediate frequency band into a second RF signal, and then may deliver the second RF signal to the second wireless communication circuit 240. The IFIC 225 may deliver a communication signal to the second wireless communication circuit 240 such that the second wireless communication circuit 240 feeds the antenna array 230 to perform communication using millimeter wave signals.

According to an embodiment, the feeding of the IFIC 225 to the 5G antenna module 200 and the feeding of the first wireless communication circuit 130 to the legacy antenna may be made separately from each other. For example, as illustrated in FIG. 3, the feeding to the 5G antenna module 200 may be made in a first direction 242. The feeding to the legacy antenna may be made in a second direction 132. For example, the feeding to the 5G antenna module 200 may be made through a first conducting wire 226, and the feeding to the legacy antenna may be made through a second conducting wire 131. The first conducting wire 226 may electrically connect the second wireless communication circuit (e.g., the second wireless communication circuit 240 of FIG. 2) included in the 5G antenna module 200 to the IFIC 225. In various embodiments, a matching circuit or at least one element (not illustrated) capable of finely adjusting a resonant frequency may be disposed on a path formed by the second conducting wire 131. For example, the element may function as a tuning element. The resonance frequency of a legacy antenna may be adjusted by the element.

For example, the first wireless communication circuit 130 may be fed through a conductive layer (e.g., the conductive layer 220 in FIG. 2) or the first point 132a of a shield can (e.g., the shield can 205 in FIG. 3) via the second conducting wire 131. The second point 132b of the conductive layer 220 may be electrically connected to the conductive region 125 of the first PCB 110. For example, it may be understood that the second point 132b is a ground point of a legacy antenna.

The first wireless communication circuit 130 may transmit and receive a first RF signal through an electrical path formed by the first point 132a and the second point 132b.

In various embodiments, a shape of the 5G antenna module 200 may be implemented variously. Referring to FIG. 4B, a shape of the 5G antenna module 200 according to various embodiments is illustrated.

In various embodiments, a part of the conductive layer included in the 5G antenna module 200 may operate as a ground region (e.g., the ground layer included in the second PCB 210).

For another example, at least part of a conductive layer included in the first PCB 110 may be extended, and a conductive region 133 of the 5G antenna module 200 may be connected electrically.

In various embodiments, it may be understood that the conductive region 133 is a ground part for the 5G antenna module 200. For example, the second point 132b of the conductive region 133 may be electrically connected with the conductive region 125 of the first PCB 110. For example, it may be understood that the second point 132b is a ground point of a legacy antenna.

In various embodiments, it may be understood that the conductive region 133 is a connection part between the 5G antenna module 200 and the first PCB 110. For example, the connection part may include a c-clip, a spring, a pogo pin, or a metal member (e.g., a metal bracket or metal housing) electrically connected to the conductive region 125 (e.g., a ground region of the first PCB 110) of the first PCB 110.

For example, a signal line (e.g., the first conducting wire 226 in FIG. 4A) connecting the IFIC 225 to the 5G antenna module 200 may be included in the connection part. In this case, the connection part may include a conductive layer included in at least part of the first PCB 110 or the second PCB 210.

Figure 5:
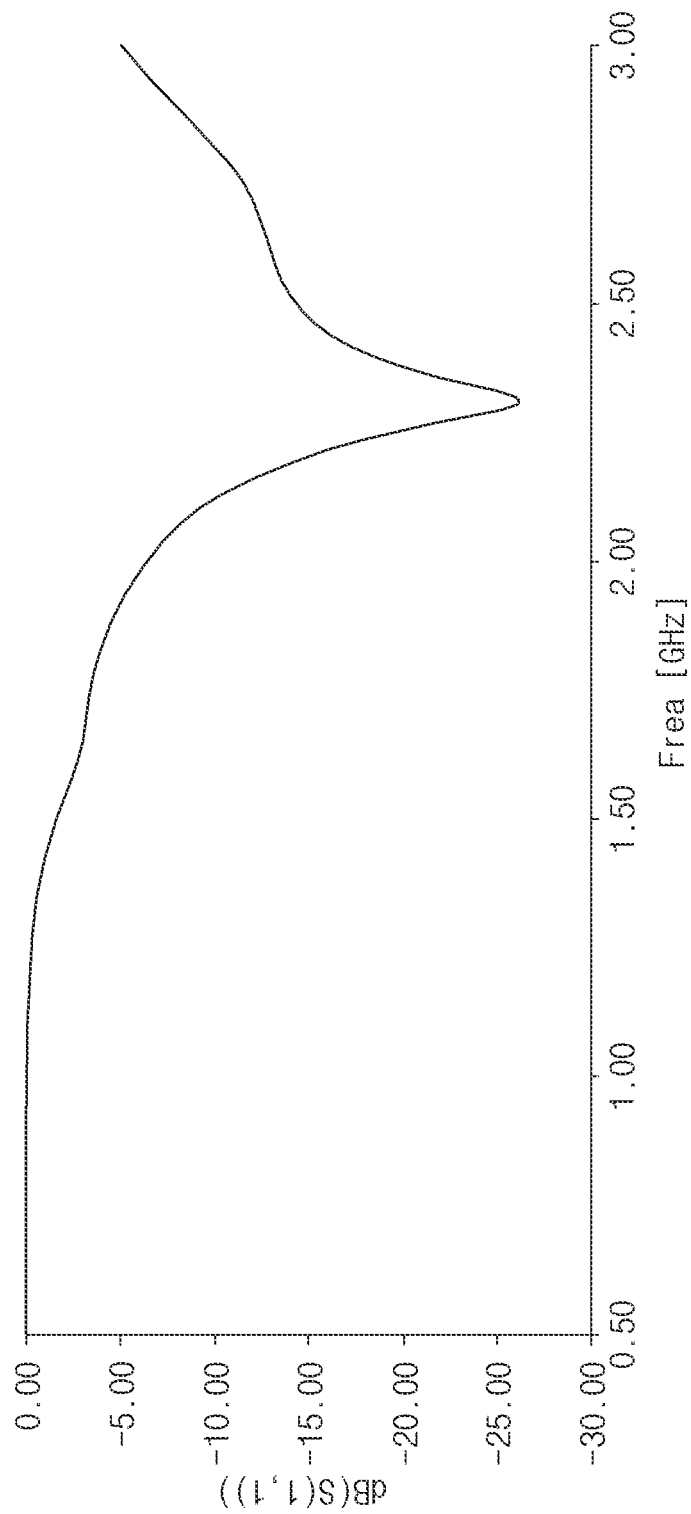
FIG. 5 is a diagram illustrating a radiation simulation result of a legacy antenna according to an embodiment.

FIG. 5 is a diagram illustrating a radiation simulation result of a legacy antenna according to an embodiment.

Referring to FIG. 5, for example, a graph illustrates a radiation simulation result for a legacy antenna using a part of the conductive layer 220 of the 5G antenna illustrated in FIG. 3. Referring to a graph, it may be seen that resonance is formed around 2.4 GHz. It may be seen that a legacy antenna capable of transmitting and receiving a signal in a frequency band of 6 GHz or less is implemented by using a part of the conductive layer 220 (e.g., a ground region or a shield can) of the 5G antenna module 200.

Figure 6:
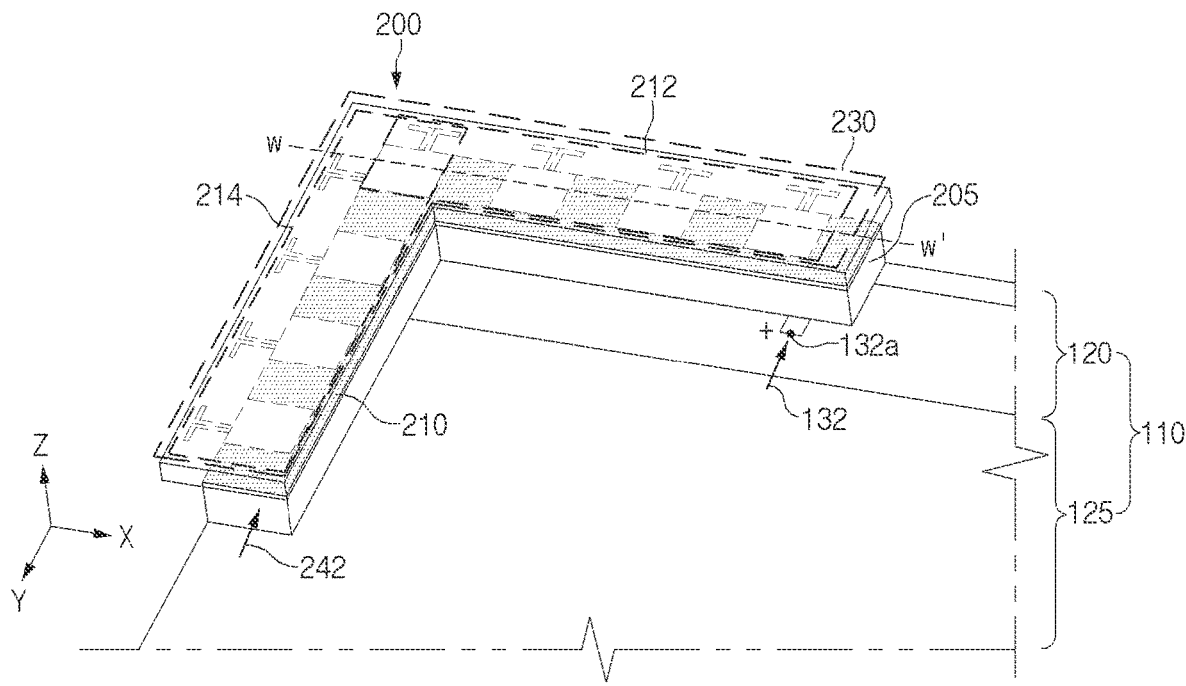
FIG. 6 is an inner perspective view of an electronic device including a 5G antenna module, according to an embodiment.
Figure 6:
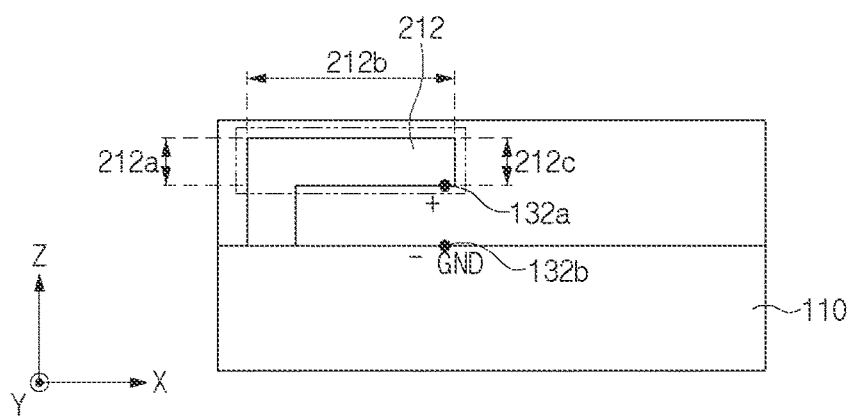

FIG. 6 is an inner perspective view of an electronic device including a 5G antenna module, according to an embodiment. The description in FIG. 6 the same as the description given with reference to FIGS. 2 and 3 will be omitted to avoid redundancy.

In various embodiments, the legacy antenna may have a loop structure depending on a location of the first point 132a that is a feed point. Referring to FIG. 6, the first wireless communication circuit 130 may be electrically connected to the first point 132a adjacent to the third side 212c of the first portion 212. The feed to the conductive layer 220 included in the first portion 212 of the second PCB 210 may be made in the direction 132 illustrated. Accordingly, a part of regions included in the second portion 214, which is a portion overlapping the conductive region 125, in the conductive layer 220 of the second PCB 210 may be implemented as an end part of a loop antenna. The legacy antenna may have a loop structure. As compared to the PIFA-type legacy antenna in FIG. 3, the legacy antenna of FIG. 6 may transmit and receive a signal in a low frequency band.

Figure 7:
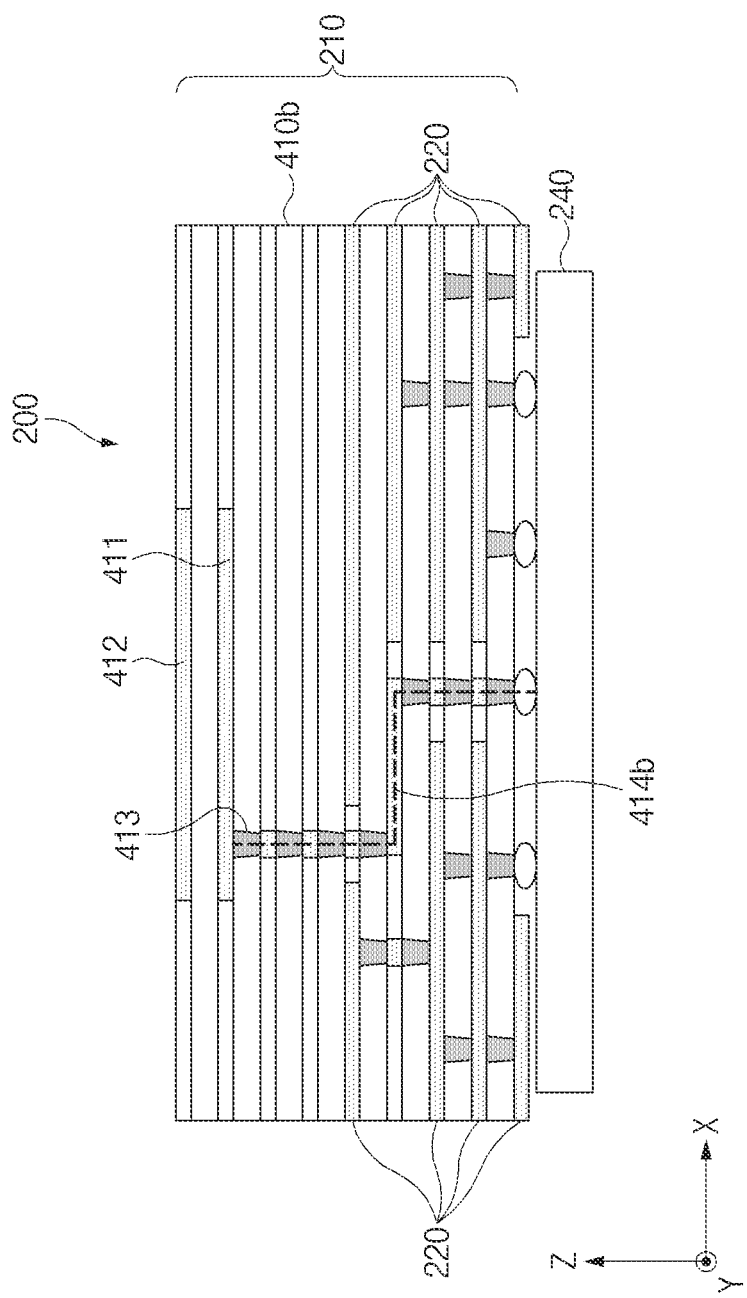
FIG. 7 is a cross-sectional view of a 5G antenna module according to an embodiment.

FIG. 7 is a cross-sectional view of a 5G antenna module according to an embodiment.

Referring to FIG. 7, an example of a structure of the 5G antenna module 200 is illustrated. The 5G antenna module 200 may include the second PCB 210 and the second wireless communication circuit 240. According to various embodiments, the 5G antenna module 200 may further include the shield can 205 as illustrated in FIG. 6.

According to an embodiment, a layer structure 410b may include a plurality of layers. For example, the layer structure 410b may include at least one layer including a conductive patch 411 or at least one layer including a coupling conductive patch 412. For another example, the layer structure 410b may include at least one layer including at least one conductive layer 220.

According to an embodiment, the second wireless communication circuit 240 may be arranged on one surface of the second PCB 210. The antenna element 411 (or a conductive patch) included in the antenna array 230 may be included in the layer structure 410b.

According to an embodiment, the second PCB 210 of the 5G antenna module 200 may have the layer structure 410b. The layer structure 410b may include a plurality of layers. For example, the layer structure 410b may include at least one layer including the conductive patch 411 or at least one layer including the coupling conductive patch 412. For another example, the layer structure 410b may include at least one conductive layer 220 including at least one conductive region.

According to an embodiment, the conductive patch 411 may be a conductive material that is supplied with a power from the second wireless communication circuit 240 to cause an electromagnetic resonance. The coupling conductive patch 412 that is a conductive material may guide a direction of an electromagnetic signal radiated from the conductive patch 411 supplied with the power.

According to an embodiment, the feeding to the conductive patch 411 may be made through vias 413 formed inside the layer structure 410b. For example, it may be understood that the vias 413 are formed in a part of the layer structure 410b and are passages through layers, respectively. For example, the conductive patch 411 and the second wireless communication circuit 240 may be electrically connected to each other through the vias 413 and a feed path 414b including at least one conductive layer 220. The conductive patch 411 may be supplied with a power through the feed path 414b. When the conductive patch 411 may be supplied with a power by the second wireless communication circuit 240, the electronic device 100 may perform communication using a millimeter wave signal.

According to an embodiment, the at least one conductive layer 220 may operate as a ground for the second wireless communication circuit 240 and the conductive patch 411. At least one of the conductive layer 220 may be supplied with a power by a first wireless communication circuit (e.g., the first wireless communication circuit 130 of FIG. 2) disposed on the first PCB (e.g., the first PCB 110 of FIG. 2), and may operate as a radiator for transmitting or receiving a first RF signal with respect to the first wireless communication circuit 130.

Figure 8:
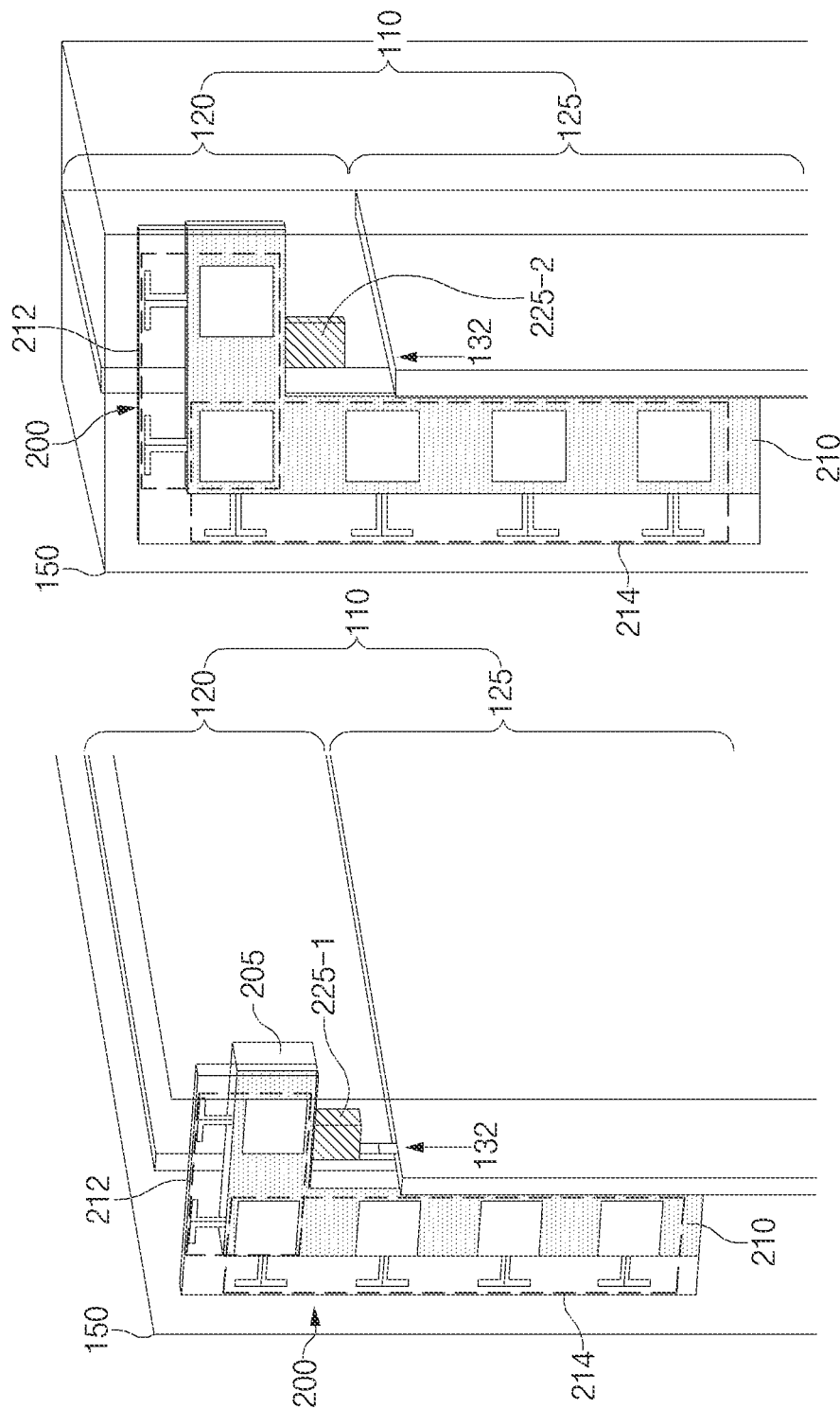
FIG. 8 is an inner perspective view of an electronic device including a 5G antenna module and a conductive member according to an embodiment.

FIG. 8 is an inner perspective view of an electronic device including a 5G antenna module and a conductive member according to an embodiment.

In various embodiments, the 5G antenna module 200 may be disposed adjacent to a side surface (e.g., the side bezel structure 11 of FIG. 1) of the housing of the electronic device 100. For example, in FIG. 8, the 5G antenna module 200 may be disposed parallel to the side surface and may be disposed perpendicular to the first PCB 110. In this case, the antenna array 230 of the 5G antenna module 200 may mainly form a beam pattern in a direction of a side surface of the electronic device 100.

In various embodiments, the electronic device 100 may include conductive members 225-1 and 225-2 electrically connected to the conductive layer 220 included in the second PCB 210. The first wireless communication circuit (e.g., the first wireless communication circuit 130 of FIG. 2) of a legacy antenna may be configured to transmit and receive a first RF signal through an electrical path formed by at least part of the conductive layer 220 and the conductive members 225-1 and 225-2.

It may be understood that the conductive members 225-1 and 225-2 are tuning elements for the legacy antenna. The shape (e.g., a size) of the conductive members 225-1 and 225-2 may be changed to form an electrical length according to a target frequency of the RF signal to be transmitted and received through the legacy antenna. For example, the conductive members 225-1 and 225-2 may be referred to as a "conductive connection member" such as a c-clip. The conductive members 225-1 and 225-2 may be referred to as a conductive pattern formed to be suitable for the target frequency.

Figure 9A:
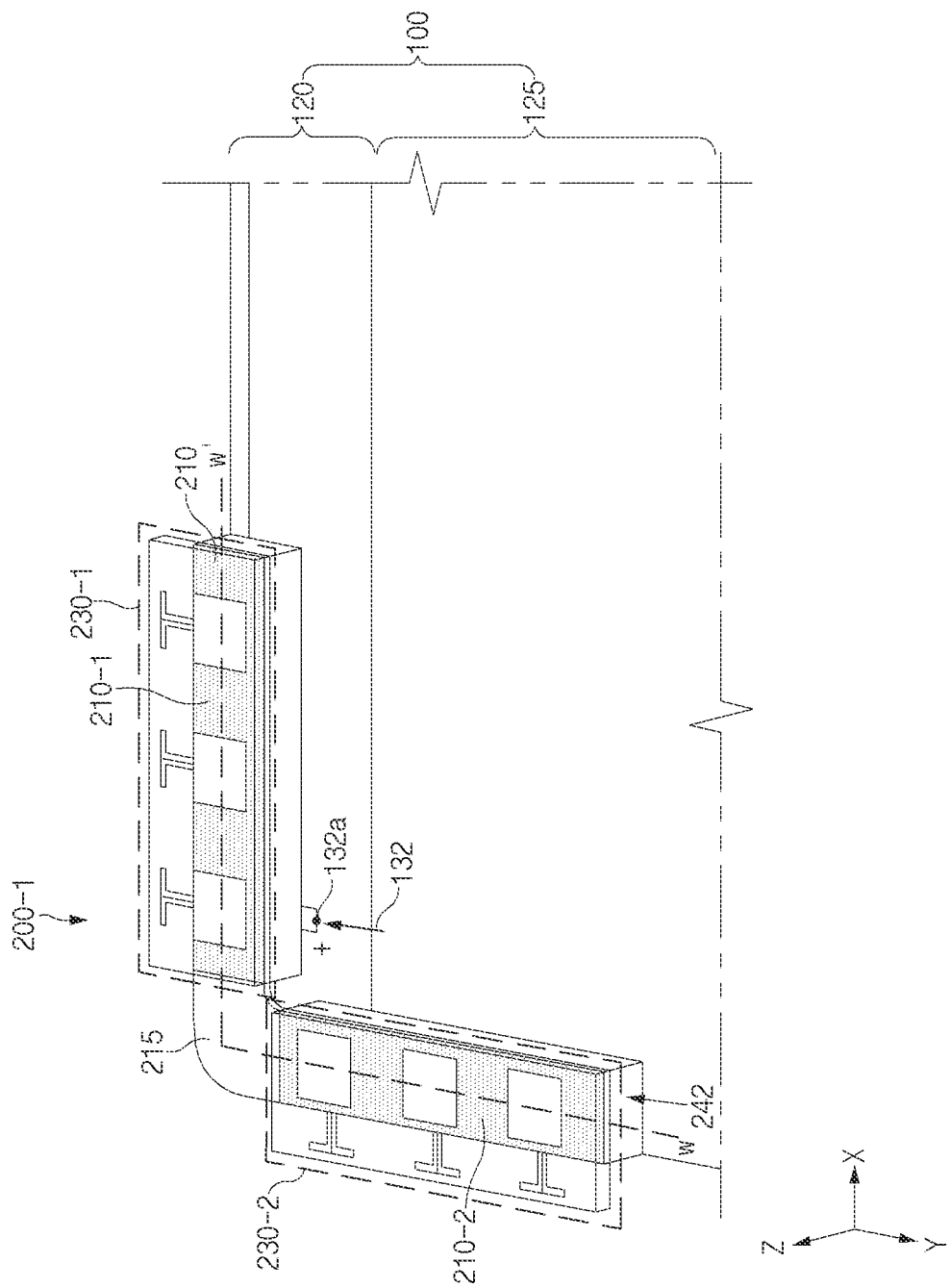
FIG. 9A is an inner perspective view of an electronic device including a 5G antenna module including a flexible printed circuit board (FPCB) according to an embodiment.
Figure 9B:
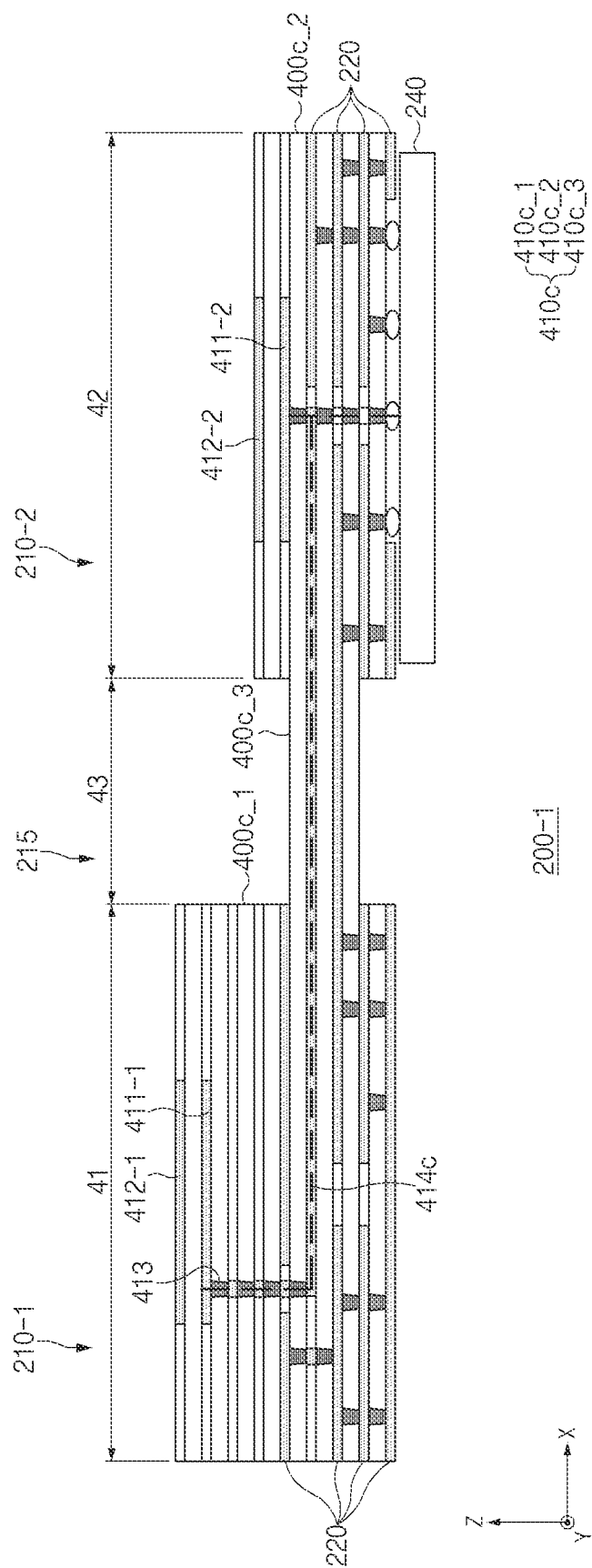
FIG. 9B is a cross-sectional view of a 5G antenna module including a FPCB according to an embodiment.

FIG. 9A is an inner perspective view of an electronic device including a 5G antenna module including a flexible printed circuit board (FPCB) according to an embodiment. FIG. 9B is a cross-sectional view of a 5G antenna module including a FPCB according to an embodiment. Hereinafter, a 5G antenna module 200-1 according to another embodiment will be described with reference to FIGS. 9A and 9B. Hereinafter, a description the same as a description given with reference to FIGS. 3, and 7 may be omitted to avoid redundancy. For example, the description associated with components having the same reference numerals will be omitted to avoid redundancy.

In various embodiments, the 5G antenna module 200-1 (e.g., the 5G antenna module 200 of FIG. 7) may include two PCBs 210-1 and 210-2 and a flexible circuit board (hereinafter, referred to as a flexible printed circuit board (FPCB)) 215 interposed between the PCBs 210-1 and 210-2. For example, the FPCB 215 may be physically coupled to one side of the first sub PCB 210-1 and may be physically coupled to one side of the second sub PCB 210-2. The first sub PCB 210-1 may be disposed adjacent to the non-conductive region 120 of the first PCB 110. The second sub PCB 210-2 may be disposed adjacent to the conductive region 125 of the first PCB 110. An antenna array 230-1 may be disposed on the first sub PCB 210-1. An antenna array 230-2 may be disposed on the second sub PCB 210-2. The antenna arrays 230-1 and 230-2 may correspond to the antenna array 230 of FIG. 2.

In an embodiment, one point of a conductive layer (e.g., the conductive layer 220 included in the first portion 212 of FIG. 3) included in the first sub PCB 210-1 may be electrically connected to the first wireless communication circuit (e.g., the first wireless communication circuit 130 of FIG. 2). For example, at least part of the conductive layer included in the first sub PCB 210-1 may operate as a radiator of a legacy antenna.

In various embodiments, at least part of the conductive layer included in the 5G antenna module 200-1 may operate as a radiator of a legacy antenna. For example, at least part of the conductive layer included in the first sub PCB 210-1 and at least part of the conductive layer included in the second sub PCB 210-2 may operate as radiators of a legacy antenna.

Referring to FIG. 9B, it is illustrated that a cross-sectional view of the 5G antenna module 200-1 (e.g., the 5G antenna module 200 of FIG. 7) includes the FPCB 215. For example, it may be understood that the cross-sectional view of FIG. 9B is a cross-sectional view of the 5G antenna module 200-1 that is viewed based on line w-w' of FIG. 9A.

The first sub PCB 210-1, the second sub PCB 210-2, and the FPCB 215 may have a layer structure. For example, the 5G antenna module 200-1 may include a first layer structure 410c_1 of the first sub PCB 210-1 disposed in a first region 41, a second layer structure 410c_2 of the second sub PCB 210-2 disposed in a second region 42, and a third layer structure 410c_3 of the FPCB 215 disposed in a third region 43. For example, the second wireless communication circuit 240 may be disposed on one surface of the second sub PCB 210-2.

According to an embodiment, the first sub PCB 210-1 may include the antenna array 230-1 (e.g., the antenna array 230 of FIG. 2) including conductive patches 411-1 and 412-1 and a part of the at least one conductive layer 220. The second sub PCB 210-2 may include the antenna array 230-2 including conductive patches 411-2 and 412-2 and the remaining part of the at least one conductive layer 220.

The FPCB 215 may include a conducting wire that electrically connects the antenna array 230 to the second wireless communication circuit 240. The FPCB 215 may include a conducting wire that electrically connects a part of the conductive layer 220 included in the first sub PCB and the remaining part of the conductive layer 220 included in the second sub PCB. The conductive patch 411 may be supplied with a power by the second wireless communication circuit 240 through the conducting wires of the FPCB 215. For example, a feed path 414c for the conductive patch 411 may be connected to a feed point of the conductive patch 411 from the second wireless communication circuit 240 through the second sub PCB 210-2, the FPCB 215, and the first sub PCB 210-1.

Figure 10A:
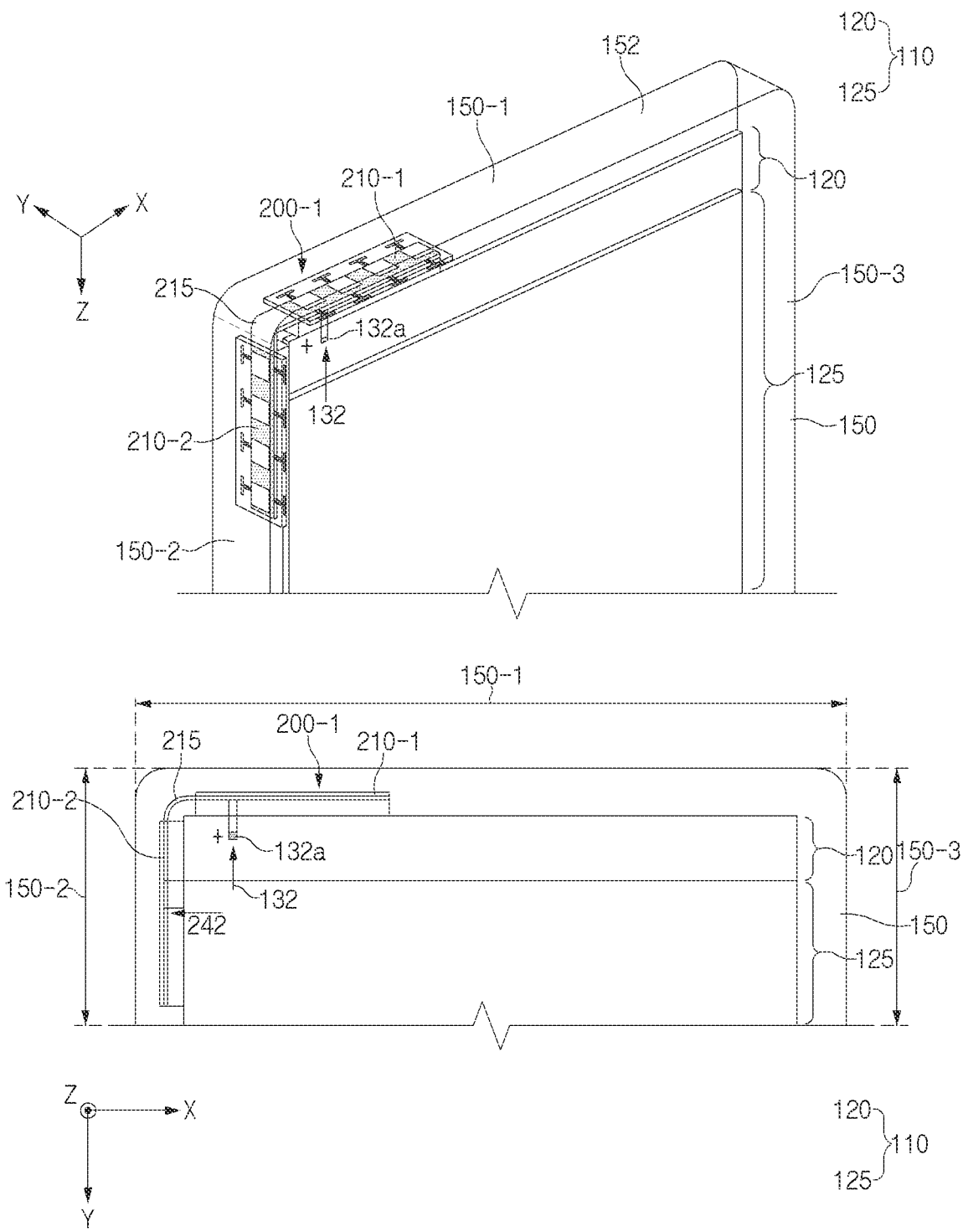
FIG. 10A is an inner perspective view of an electronic device, according to various embodiments.
Figure 10B:
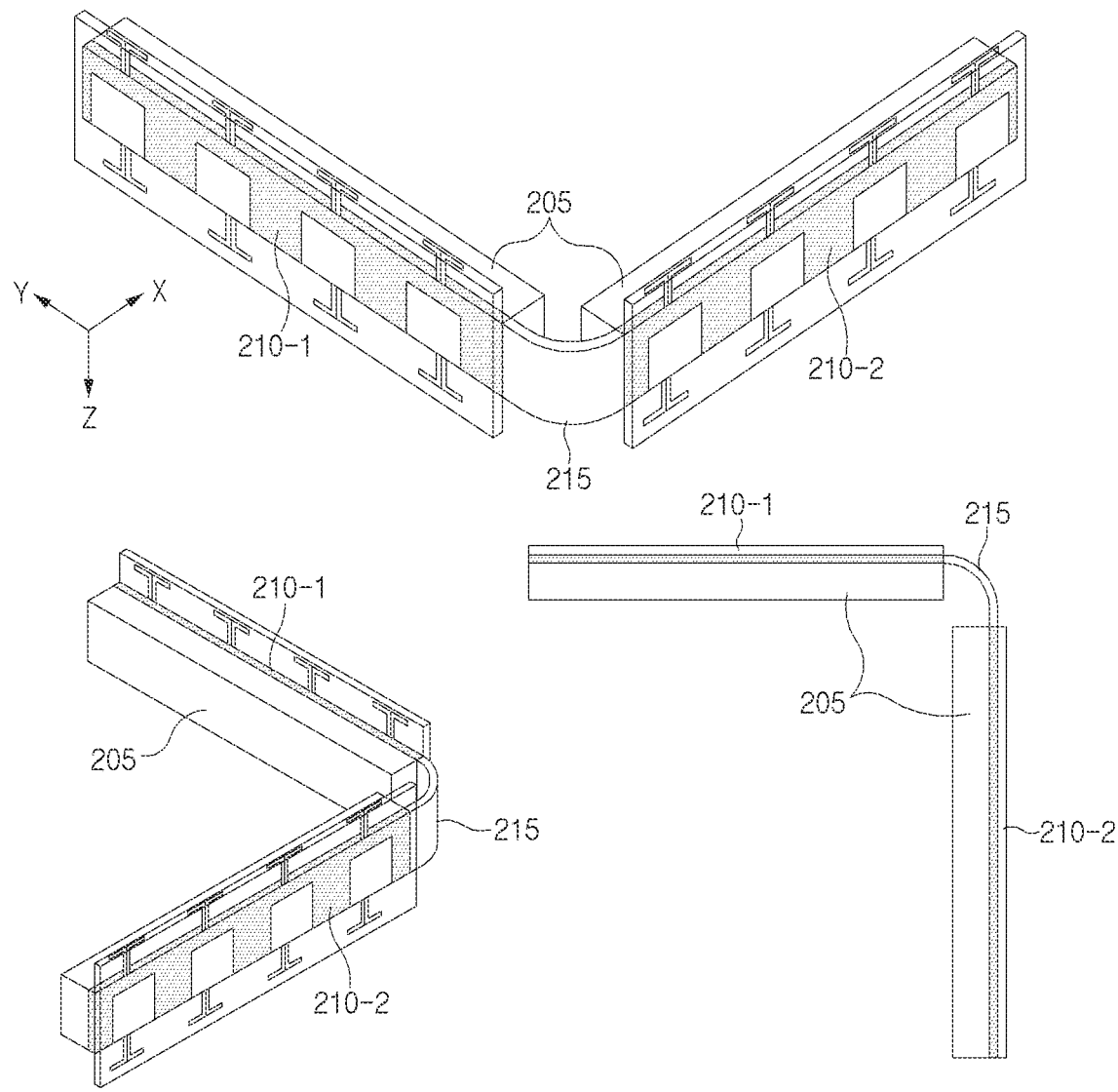
FIG. 10B is a three-dimensional view of a 5G antenna module according to various embodiments.

FIG. 10A is an inner perspective view of an electronic device, according to various embodiments. FIG. 10B is a three-dimensional view of a 5G antenna module according to various embodiments.

Referring to FIGS. 10A and 10B, the first sub PCB 210-1 and the second sub PCB 210-2 of the 5G antenna module 200-1 according to various embodiments may be disposed perpendicular to the first PCB 110. It may be understood that the first sub PCB 210-1 and the second sub PCB 210-2 illustrated in FIG. 9A are disposed parallel to the first PCB 110. For example, the first sub PCB 210-1 and the second sub PCB 210-2 may have a necessary arrangement depending on the directivity of an RF signal to be transmitted and received through the 5G antenna module 200-1.

In an embodiment, a housing 150 of the electronic device 100 may include a first surface, a second surface facing away from the first surface, and the side surface 152 (e.g., the side bezel structure 11 of FIG. 1) surrounding a space between the first surface and the second surface. The side surface 152 may include the first side region 150-1 extending in a first direction, the second side region 150-2 extending in a second direction perpendicular to the first direction from one end of the first side region 150-1, and the third side region 150-3 extending in the second direction from the other end of the first side region 150-1.

For example, the first sub PCB 210-1 may correspond to the first side region 150-1. The second sub PCB 210-2 may correspond to the second side region 150-2. Referring to FIG. 10A, it is illustrated that the first sub PCB 210-1 is disposed parallel to the first side region 150-1 and disposed perpendicular to the first PCB 110. It is illustrated that the second sub PCB 210-2 is disposed parallel to the second side region 150-2 and disposed perpendicular to the first PCB 110. The FPCB 215 may be interposed between the first sub PCB 210-1 and the second sub PCB 210-2. For example, the FPCB 215 may be disposed in a curved manner so as to correspond to a corner between the first side region 150-1 and the second side region 150-2.

As described above with reference to FIG. 9A, the conductive layer 220 included in the first sub PCB 210-1 may be supplied with a power by the first wireless communication circuit 130 (the direction 132). At least part of the conductive layer 220 included in the first sub PCB 210-1 may operate as a radiator of a legacy antenna.

Figure 11:
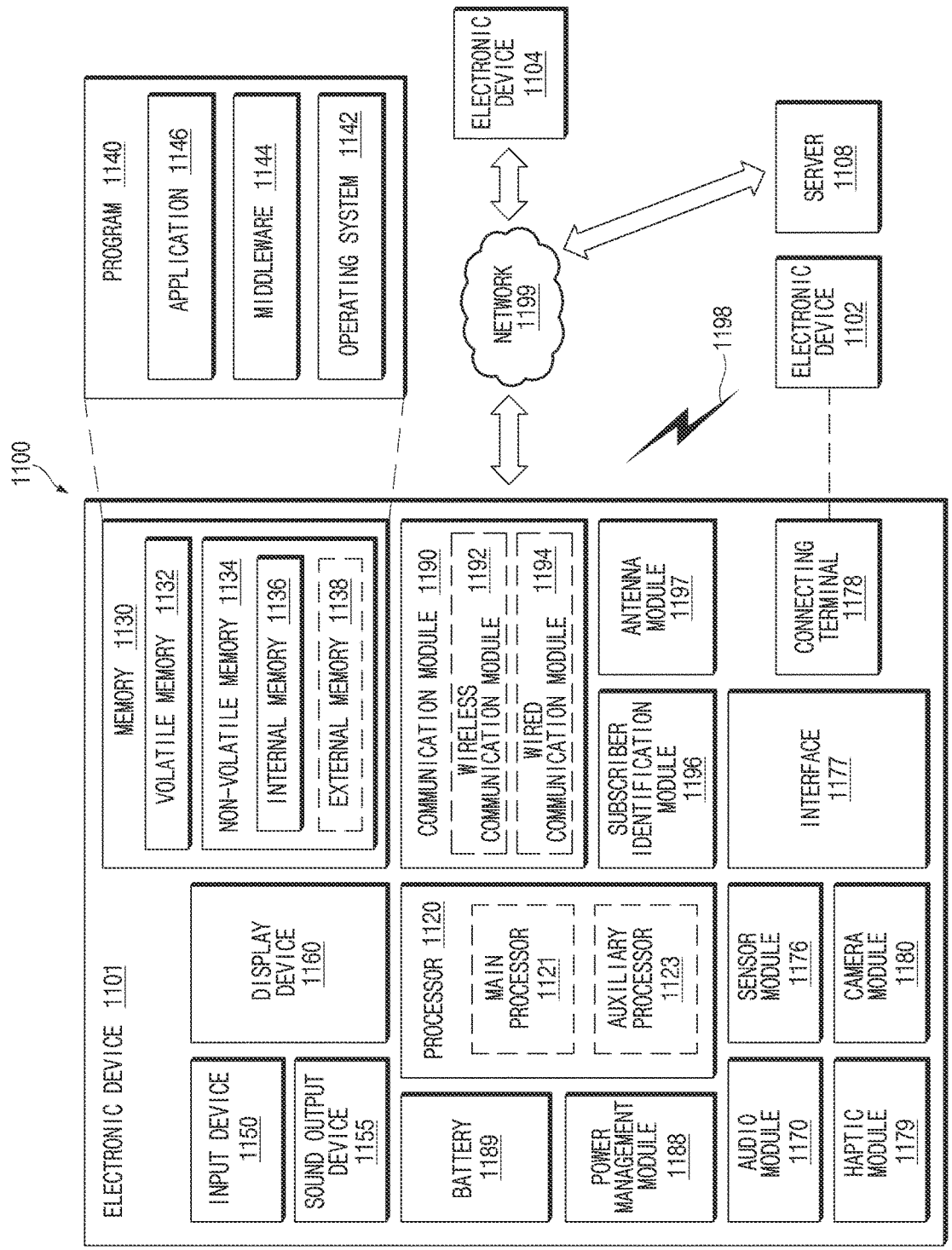
FIG. 11 is a block diagram of an electronic device in a network environment, according to various embodiments.

FIG. 11 is a block diagram illustrating an electronic device 1101 in a network environment 1100 according to various embodiments.

Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, a keyboard, or a digital pen (e.g., a stylus pen).

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips)

separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., PCB). According to an embodiment, the antenna module 1197 may include a plurality of antennas. In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

Figure 12:
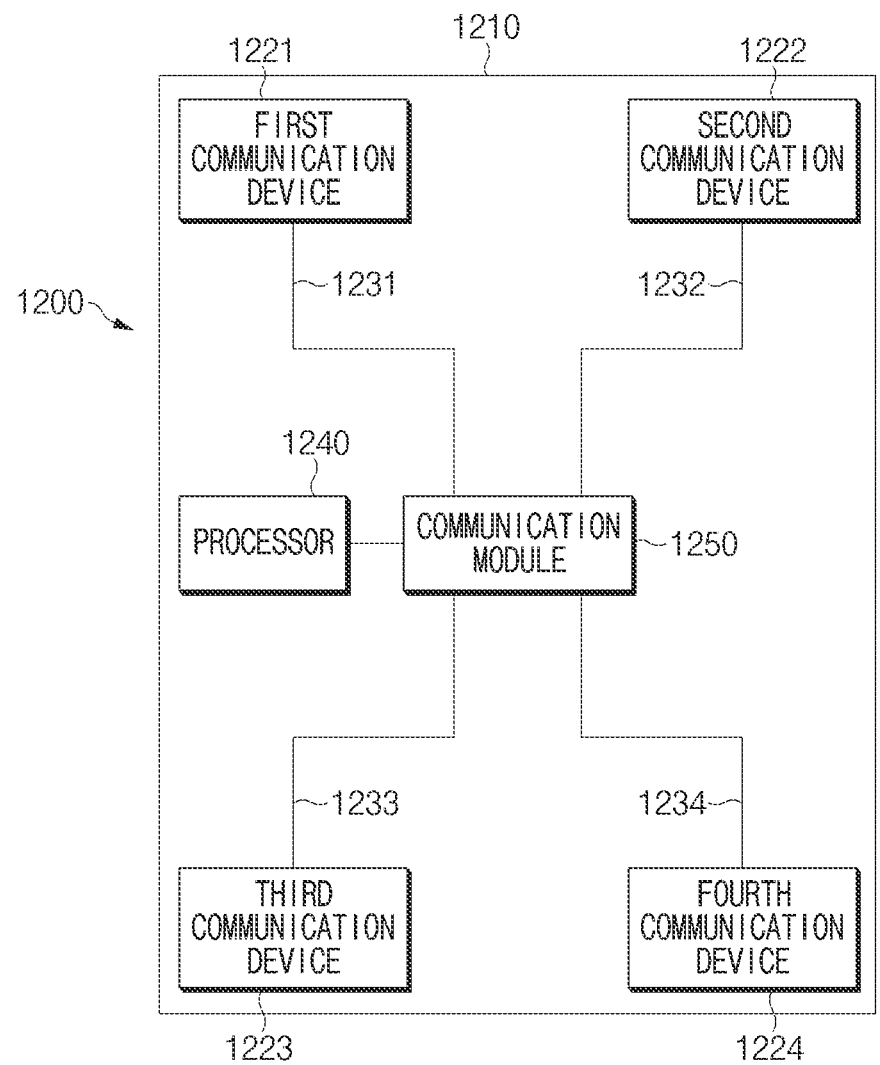
FIG. 12 is a diagram illustrating an example of an electronic device supporting 5G communication.

FIG. 12 is a diagram illustrating an example of an electronic device supporting 5G communication.

Referring to FIG. 12, an electronic device 1200 (e.g., the electronic device 100 of FIG. 2 or the electronic device 1101 of FIG. 11) may include a housing 1210, a processor 1240 (e.g., the processor 1120 of FIG. 11), a communication module 1250 (e.g., the communication module 1190 of FIG. 11), a first communication device 1221, a second communication device 1222, a third communication device 1223, a fourth communication device 1224, a first conductive line 1231, a second conductive line 1232, a third conductive line 1233, or a fourth conductive line 1234. The first communication device 1221, the second communication device 1222, the third communication device 1223, and the fourth communication device 1224 may correspond to the 5G antenna module 200 of FIG. 2.

According to an embodiment, the housing 1210 may protect any other components of the electronic device 1200. The housing 1210 may include, for example, a front plate, a back plate facing away from the front plate, and a side member (or a metal frame) surrounding a space between the front plate and the back plate. The side member may be attached to the back plate or may be integrally formed with the back plate.

According to an embodiment, the electronic device 1200 may include at least one communication device. For example, the electronic device 1200 may include at least one of the first communication device 1221, the second communication device 1222, the third communication device 1223, or the fourth communication device 1224.

According to an embodiment, the first communication device 1221, the second communication device 1222, the third communication device 1223, or the fourth communication device 1224 may be positioned within the housing 1210. According to an embodiment, when viewed from above the back plate of the electronic device, the first communication device 1221 may be positioned at a left top end of the electronic device 1200; the second communication device 1222 may be positioned at a right top end of the electronic device 1200; the third communication device 1223 may be positioned at a left bottom end of the electronic device 1200; and the fourth communication device 1224 may be positioned at a right bottom end of the electronic device 1200.

According to an embodiment, the processor 1240 may include one or more of a central processing unit, an application processor, a graphic processing unit (GPU), an image signal processor of a camera, or a baseband processor (or a communication processor (CP)). According to an embodiment, the processor 1240 may be implemented with a system on chip (SoC) or a system in package (SiP).

According to an embodiment, the communication module 1250 may be electrically connected with at least one communication device by using at least one conductive line. For example, the communication module 1250 may be electrically connected with the first communication device 1221, the second communication device 1222, the third communication device 1223, or the fourth communication device 1224 by using the first conductive line 1231, the second conductive line 1232, the third conductive line 1233, or the fourth conductive line 1234, respectively. The communication module 1250 may include, for example, a baseband processor or at least one communication circuit (e.g., an IFIC or an RFIC). The communication module 1250 may include, for example, a baseband processor independent of the processor 1240 (e.g., an application processor (AP)). The first conductive line 1231, the second conductive line 1232, the third conductive line 1233, or the fourth conductive line 1234 may include, for example, a coaxial cable or a FPCB.

According to an embodiment, the communication module 1250 may include a first baseband processor (BP) (not illustrated) or a second BP (not illustrated). The electronic device 1200 may further include one or more interfaces for supporting inter-chip communication between the first BP (or the second BP) and the processor 1240. The processor 1240 and the first BP or the second BP may transmit/receive data, using the inter-chip interface (e.g., an inter processor communication channel).

According to an embodiment, the first BP or the second BP may provide an interface for performing communication with any other entities. The first BP may support, for example, wireless communication with regard to a first network (not illustrated). The second BP may support, for example, wireless communication with regard to a second network (not illustrated).

According to an embodiment, the first BP or the second BP may form one module with the processor 1240. For example, the first BP or the second BP may be integrally formed with the processor 1240. For another example, the first BP or the second BP may be disposed in one chip or may be implemented in the form of an independent chip. According to an embodiment, the processor 1240 and at least one baseband processor (e.g., the first BP) may be integrally formed within one chip (e.g., an SoC), and another baseband processor (e.g., the second BP) may be implemented in the form of an independent chip.

According to an embodiment, the first network (not illustrated) or the second network (not illustrated) may correspond to the network 1199 of FIG. 11. According to an embodiment, the first network (not illustrated) and the second network (not illustrated) may include a 4th generation (4G) network and a 5th generation (5G) network, respectively. The 4G network may support, for example, a long term evolution (LTE) protocol defined in the 3GPP. The 5G network may support, for example, a new radio (NR) protocol defined in the 3GPP.

Figure 13:
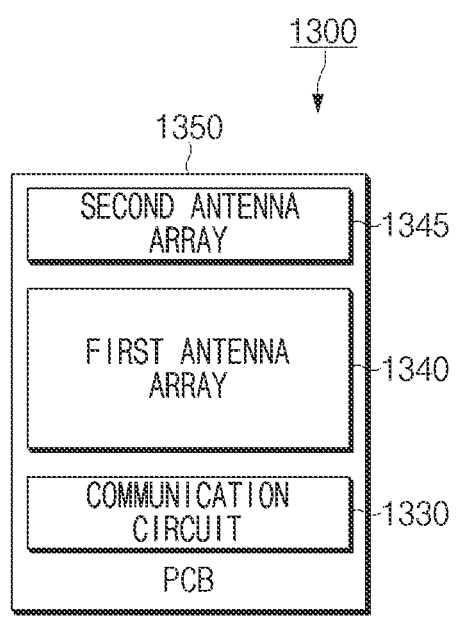
FIG. 13 is a block diagram of a communication device according to an embodiment.

FIG. 13 is a block diagram of a communication device according to an embodiment.

Referring to FIG. 13, a communication device 1300 (e.g., the 5G antenna module 200 of FIG. 2, the first communication device 1221, the second communication device 1222, the third communication device 1223, or the fourth communication device 1224 of FIG. 12) may include a communication circuit 1330 (e.g., RFIC) (e.g., the second wireless communication circuit 240 of FIG. 2), a PCB 1350 (e.g., the second PCB 210 of FIG. 2), a first antenna array 1340, or a second antenna array 1345. For example, the communication device 130 may be referred to as the "5G antenna module 200" of FIG. 2 or the "5G antenna module 200-1" of FIG. 9A. For example, the first antenna array 1340 and the second antenna array 1345 may be referred to as the "antenna array" 230 of FIG. 2.

According to an embodiment, the communication circuit 1330, the first antenna array 1340, or the second antenna array 1345 may be disposed on the PCB 1350. For example, the first antenna array 1340 or the second antenna array 1345 may be disposed on a first surface of the PCB 1350, and the communication circuit 1330 may be disposed on a second surface of the PCB 1350. The PCB 1350 may include a connector (e.g., a coaxial cable connector or a board-to-board (B-to-B) connector) for electrical connection with any other PCB (e.g., a PCB on which the communication module 1250 of FIG. 12 is disposed), using a transmission line (e.g., the first conductive line 1231 of FIG. 12 or a coaxial cable). For example, the PCB 1350 may be connected to the PCB, on which the communication module 1250 is disposed, using the coaxial cable connector, and the coaxial cable may be used to transfer a receive/transmit IF signal or an RF signal. For another example, a power or any other control signal may be delivered through the B-to-B connector.

According to an embodiment, the first antenna array 1340 or the second antenna array 1345 may include a plurality of antenna elements. The antenna elements may include a patch antenna, a loop antenna, or a dipole antenna. For example, an antenna element included in the first antenna array 1340 may be a patch antenna for forming a beam toward the back plate of the electronic device 1200. For another example, an antenna element included in the second antenna array 1345 may be a dipole antenna or a loop antenna to form a beam toward the side member of the electronic device 1200.

According to an embodiment, the communication circuit 1330 may support at least part (e.g., 24 GHz to 30 GHz or 37 GHz to 40 GHz) of a band ranging from 24 GHz to 100 GHz. According to an embodiment, the communication circuit 1330 may up-convert or down-convert a frequency. For example, the communication circuit 1330 included in the communication device 1300 (e.g., the first communication device 1221 of FIG. 12) may up-convert an IF signal received from a communication module (e.g., the communication module 1250 of FIG. 12) through a conductive line (e.g., the first conductive line 1231 of FIG. 12) into an RF signal. For another example, the communication circuit 1330 included in the communication device 1300 (e.g., the first communication device 1221 of FIG. 12) may down-convert an RF signal (e.g., a millimeter wave signal) received through the first antenna array 1340 or the second antenna array 1345 into an IF signal and may transmit the IF signal to a communication module by using a conductive line.

According to various embodiments of the disclosure, the performance of a 5G antenna module and the performance of an antenna supporting a conventional communication technology may be maintained at a specified level or higher, in a limited mounting space. Also, an electronic device may be further miniaturized by using a mounting space efficiently. This may allow a user to make use of an electronic device that has a smaller size and more improved performance.

An electronic device (e.g., the electronic device 100 of FIG. 2) may include a first printed circuit board (PCB) (e.g., the first PCB 110 of FIG. 2) including a non-conductive region (e.g., the non-conductive region 120 of FIG. 2) and a conductive region (e.g., the conductive region 125 of FIG. 2) operating as a ground, a first wireless communication circuit (e.g., the first wireless communication circuit 130 of FIG. 2) disposed on the first PCB; and a 5th generation (5G) antenna module (e.g., the 5G antenna module 200 of FIG. 2) disposed adjacent to the first PCB. The 5G antenna module may include at least one second PCB (e.g., the second PCB 210 of FIG. 2) including an antenna array (e.g., the antenna array 230 of FIG. 2) and a conductive layer (e.g., the conductive layer 220 of FIG. 2) operating as a ground of the antenna array, and a second wireless communication circuit (e.g., the second wireless communication circuit 240 of FIG. 2) electrically connected to the antenna array. The second PCB may include a first portion (e.g., the first portion 212 of FIG. 3) and a second portion (e.g., the second portion 214 of FIG. 2) having a predetermined angle with the first portion, wherein the first portion is disposed adjacent to the non-conductive region and at least part of the second portion is disposed adjacent to the conductive region. The first wireless communication circuit may be electrically connected to a first point (e.g., the first point 132a of FIG. 3) of the conductive layer included in the first portion and configured to transmit or receive a first RF signal in a first frequency band by using the conductive region and at least part of the conductive layer. The second wireless communication circuit may transmit or receive a second RF signal in a second frequency band by using the antenna array.

In an embodiment, the first frequency band may include a frequency band of 6 GHz or lower, and the second frequency band may include a frequency band of 20 GHz or higher.

According to an embodiment, the electronic device may further include a housing including a first surface, a second surface facing away from the first surface, and a side surface surrounding a space between the first surface and the second surface. The first PCB, the first wireless communication circuit, and the 5G antenna module may be disposed inside the housing.

In an embodiment, the first portion and the second portion may be disposed adjacent to the side surface (e.g., the side bezel structure 11 of FIG. 1) of the housing.

In an embodiment, the first portion may include a first side (e.g., the first side 212a of FIG. 3) adjacent to the second portion, a second side (e.g., the second side 212b of FIG. 3) extending from one end of the first side and perpendicular to the first side, and a third side (e.g., the third side 212c of FIG. 3) extending from one end of the second side and paralleled to the first side. The first wireless communication circuit may be electrically connected to the first point (e.g., the first point 132a of FIG. 3) adjacent to the first side.

In an embodiment, the first portion may include a first side (e.g., the first side 212a of FIG. 6) adjacent to the second portion, a second side (e.g., the second side 212b of FIG. 6) extending from one end of the first side and perpendicular to the first side, and a third side (e.g., the third side 212c of FIG. 6) extending from one end of the second side and paralleled to the first side. The first wireless communication circuit may be electrically connected to the first point (e.g., the first point 132a of FIG. 6) adjacent to the third side.

In an embodiment, the side surface may include a first side region (e.g., the first side region 150-1 of FIG. 10A) extending in a first direction, a second side region (e.g., the second side region 150-2 of FIG. 10A) extending in a second direction perpendicular to the first direction from one end of the first side region, and a third side region (e.g., the third side region 150-3 of FIG. 10A) extending in the second direction from the other end of the first side region. The first portion may correspond to the first side region, and the second portion may correspond to the second side region.

In an embodiment, the at least one second PCB may include a first sub PCB (e.g., the first sub PCB 210-1 of FIG. 9A) corresponding to the first portion and a second sub PCB (e.g., the second sub PCB 210-2 of FIG. 9A) corresponding to the second portion. The 5G antenna module may further include a flexible printed circuit board (FPCB) (e.g., the FPCB 215 of FIG. 10A) interposed between the first sub PCB and the second sub PCB. The FPCB may be disposed in a curved manner so as to correspond to a corner between the first side region and the second side region.

In an embodiment, the conductive region may be electrically connected to a second point (e.g., the ground point 132b of FIG. 3) of the conductive layer different from the first point.

In an embodiment, the first wireless communication circuit may transmit or receive the first RF signal through an electrical path formed based on the first point and the second point.

In an embodiment, the electronic device may further include a conductive member (e.g., the conductive members 225-1 and 225-2 of FIG. 8) disposed in a region corresponding to the second wireless communication circuit of the second PCB. The first wireless communication circuit may be electrically connected to the first point or one point of the conductive member.

In an embodiment, the first wireless communication circuit may transmit or receive the first RF signal through an electrical path formed based on one point of the conductive member and the second point.

In an embodiment, the first portion and the second portion may be substantially perpendicular to each other.

In an embodiment, the conductive layer may be electrically connected to a conductive member. The first wireless communication circuit may transmit or receive the first RF signal through an electrical path formed by at least part of the conductive layer and the conductive member.

In an embodiment, the first sub PCB and the second sub PCB may be disposed perpendicular to the first PCB.

According to an embodiment, an electronic device may include a housing that includes a first plate (e.g., the front plate 12 of FIG. 1), a second plate (e.g., the back plate 18 of FIG. 1) facing away from the first plate, and a side member (e.g., the side bezel structure 11 of FIG. 1) surrounding a space between the first plate and the second plate, a first PCB that is disposed in the housing, an antenna structure (e.g., the 5G antenna module 200 of FIG. 2) that is disposed in the housing and includes a second PCB (e.g., the second PCB 210 of FIG. 2) including a first surface facing in a first direction, a second surface facing away from the first surface, and at least one conductive layer (e.g., the conductive layer 220 of FIG. 2) between the first surface and the second surface, and an antenna array (e.g., the antenna array 230 of FIG. 2) paralleled to the first surface and formed on the first surface or in the second PCB, a first wireless communication circuit (e.g., the first wireless communication circuit 130 of FIG. 2) transmitting and/or receiving a first signal including a first frequency between 600 MHz and 6 GHz and electrically connected to one point of the at least one conductive layer providing an electrical length corresponding to the first frequency, and a second wireless communication circuit (e.g., the second wireless communication circuit 240 of FIG. 2) electrically connected to the antenna array and transmitting and/or receiving a second signal including a second frequency between 6 GHz and 100 GHz.

In an embodiment, the first PCB may include a conductive region (e.g., the conductive region 125 of FIG. 2) and a non-conductive region (e.g., the non-conductive region 120 of FIG. 2). The second PCB may include a first portion (e.g., the first portion 212 of FIG. 3) disposed adjacent to the non-conductive region and a second portion (e.g., the second portion 214 of FIG. 2) disposed adjacent to the conductive region. The first wireless communication circuit may be electrically connected to the one point of the at least one conductive layer corresponding to the first portion.

In an embodiment, the side member may include a first side region (e.g., the first side region 150-1 of FIG. 10A) extending in a first direction, a second side region (e.g., the second side region 150-2 of FIG. 10A) extending in a second direction perpendicular to the first direction from one end of the first side region, and a third side region (e.g., the third side region 150-3 of FIG. 10A) extending in the second direction from the other end of the first side region. The first portion may correspond to the first side region, and the second portion may correspond to the second side region.

In an embodiment, the antenna structure may further include a FPCB (e.g., the FPCB 215 of FIG. 10A) interposed between the first portion and the second portion. The FPCB may be disposed in a curved manner so as to correspond to a corner between the first side region and the second side region.

In an embodiment, the conductive layer may operate as a ground of the antenna structure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first printed circuit board (PCB) including a non-conductive region and a conductive region, the conductive region operating as a ground;
a first wireless communication circuit disposed on the first PCB; and
5th generation (5G) antenna circuitry disposed adjacent to the first PCB,
wherein the 5G antenna circuitry comprises:
at least one second PCB including an antenna array and a conductive layer, the conductive layer operating as a ground of the antenna array; and
a second wireless communication circuit electrically connected to the antenna array,
wherein the at least one second PCB includes a first portion and a second portion having a predetermined angle with the first portion, the first portion having a first rectangular shape and the second portion having a second rectangular shape, a long edge of first rectangular shape of the first portion extending a first distance in a first direction and a long edge of the second rectangular shape of the second portion extending a second distance different from the first distance in a second direction perpendicular to the first direction,
wherein the first portion is disposed adjacent to the non-conductive region,
wherein a part of the second portion is disposed adjacent to the conductive region and a remaining part of the second portion is disposed adjacent to the non-conductive region, wherein a second point of the part of the second portion is electrically connected to the conductive region of the first PCB, wherein the first wireless communication circuit is electrically connected to a first point of the conductive layer included in the first portion, wherein the first wireless communication circuit is configured to transmit or receive a first RF signal in a first frequency band by using the conductive region and at least part of the conductive layer, and wherein the second wireless communication circuit is configured to transmit or receive a second RF signal in a second frequency band by using the antenna array.

2. The electronic device of claim 1,
wherein the first frequency band includes a frequency band of 6 gigahertz (GHz) or lower, and
wherein the second frequency band includes a frequency band of 20 GHz or higher.

3. The electronic device of claim 1, further comprising:
a housing including a first surface, a second surface facing away from the first surface, and a side surface surrounding a space between the first surface and the second surface,
wherein the first PCB, the first wireless communication circuit, and the 5G antenna circuitry are disposed inside the housing.

4. The electronic device of claim 3, wherein the first portion and the second portion are disposed adjacent to the side surface of the housing.

5. The electronic device of claim 4,
wherein the first portion includes a first side adjacent to the second portion, a second side extending from one end of the first side and perpendicular to the first side, and a third side extending from one end of the second side and paralleled to the first side, and
wherein the first wireless communication circuit is electrically connected to the first point adjacent to the first side.

6. The electronic device of claim 4,
wherein the first portion includes a first side adjacent to the second portion, a second side extending from one end of the first side and perpendicular to the first side, and a third side extending from one end of the second side and paralleled to the first side, and
wherein the first wireless communication circuit is electrically connected to the first point adjacent to the third side.

7. The electronic device of claim 3,
wherein the side surface includes a first side region extending in a first direction, a second side region extending in a second direction perpendicular to the first direction from a first end of the first side region, and a third side region extending in the second direction from a second end of the first side region, and
wherein the first portion corresponds to the first side region, and the second portion corresponds to the second side region.

8. The electronic device of claim 7,
wherein the at least one second PCB includes a first sub PCB corresponding to the first portion and a second sub PCB corresponding to the second portion,
wherein the 5G antenna circuitry further comprises a flexible printed circuit board (FPCB) interposed between the first sub PCB and the second sub PCB, and
wherein the FPCB is disposed in a curved manner so as to correspond to a corner between the first side region and the second side region.

9. The electronic device of claim 8, wherein the first sub PCB and the second sub PCB are disposed perpendicular to the first PCB.

10. The electronic device of claim 1, wherein the conductive region is electrically connected to a second point of the conductive layer different from the first point.

11. The electronic device of claim 10, wherein the first wireless communication circuit is further configured to transmit or receive the first RF signal through an electrical path formed based on the first point and the second point.

12. The electronic device of claim 10, further comprising:
a conductive member disposed in a region corresponding to the second wireless communication circuit of the at least one second PCB,
wherein the first wireless communication circuit is electrically connected to at least one of the first point or one point of the conductive member.

13. The electronic device of claim 12, wherein the first wireless communication circuit is further configured to transmit or receive the first RF signal through an electrical path formed based on the one point of the conductive member and the second point.

14. The electronic device of claim 1, wherein the first portion and the second portion are substantially perpendicular to each other.

15. The electronic device of claim 1,
wherein the conductive layer is electrically connected to a conductive member, and
wherein the first wireless communication circuit is further configured to transmit or receive the first RF signal through an electrical path formed by the at least part of the conductive layer and the conductive member.

16. The electronic device of claim 1, wherein the antenna array is formed on one surface of the at least one second PCB.

17. The electronic device of claim 1,
wherein the first wireless communication circuit is electrically connected to the first point of the conductive layer through a first electrical path formed by a conducting member, and
wherein a matching circuit for adjusting a resonant frequency is disposed on the first electrical path formed by the conducting member.

18. The electronic device of claim 1, wherein the conductive layer comprises a shield can configured to provide shielding for the antenna array.

* * * * *